United States Patent
Pirch et al.

(10) Patent No.: US 12,133,077 B2
(45) Date of Patent: *Oct. 29, 2024

(54) PHYSICAL ACCESS CONTROL SYSTEMS WITH LOCALIZATION-BASED INTENT DETECTION

(71) Applicant: ASSA ABLOY AB, Stockholm (SE)

(72) Inventors: Hans-Juergen Pirch, Gratwein Strassengel (AT); Fredrik Carl Stefan Einberg, Huddinge (SE); Tomas Lars Jonsson, Rönninge (SE); Sylvain Jacques Prevost, Austin, TX (US); Jan Steffl, Senomaty (CZ); Hans Gunnar Frank, Spånga (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,657

(22) Filed: Aug. 9, 2023

(65) Prior Publication Data
US 2023/0388799 A1 Nov. 30, 2023

Related U.S. Application Data

(63) Continuation of application No. 17/812,426, filed on Jul. 13, 2022, now Pat. No. 11,765,588, which is a
(Continued)

(51) Int. Cl.
*H04L 29/06* (2006.01)
*G06F 12/14* (2006.01)
(Continued)

(52) U.S. Cl.
CPC ........ *H04W 12/08* (2013.01); *G06F 12/1458* (2013.01); *G06N 3/08* (2013.01);
(Continued)

(58) Field of Classification Search
None
See application file for complete search history.

(56) References Cited

U.S. PATENT DOCUMENTS

| | | |
|---|---|---|
| 7,446,644 B2 | 11/2008 | Schaffzin et al. |
| 7,499,674 B2 | 3/2009 | Salokannel et al. |

(Continued)

FOREIGN PATENT DOCUMENTS

| | | |
|---|---|---|
| AU | 2018389642 A1 | 5/2020 |
| AU | 2020249420 B2 | 1/2023 |

(Continued)

OTHER PUBLICATIONS

Hu, Chunqiang et al. Secure and Efficient Data Communication Protocol for Wireless Body Area Networks. IEEE Transactions on Multi-Scale Computing Systems, vol. 2, Issue: 2. https://ieeexplore.ieee.org/stamp/stamp.jsp?tp=&arnumber=7399415 (Year: 2016).*
(Continued)

*Primary Examiner* — Jeremiah L Avery
(74) *Attorney, Agent, or Firm* — Schwegman Lundberg & Woessner, P.A.

(57) ABSTRACT

Systems and techniques for a physical access control systems with localization-based intent detection are described herein. In an example, an access control system may regulate access to an asset. The access control system is adapted to establish a first connection with a key-device. The access control system may be further adapted to receive a credential for a user over the first connection. The access control system may be further adapted to establish a second connection with the key-device. The access control system may be further adapted to determine an intent of the user to access the asset. The access control system may use location data derived from the second connection to determine the intent of the user. The access control system may be further
(Continued)

adapted to provide the credential to an access controller, based on identifying an intent of the user to access the asset.

20 Claims, 14 Drawing Sheets

Related U.S. Application Data continuation of application No. 16/828,001, filed on Mar. 24, 2020, now Pat. No. 11,405,784.

(60) Provisional application No. 62/823,341, filed on Mar. 25, 2019.

(51) Int. Cl.
| | |
|---|---|
| *G06N 3/08* | (2023.01) |
| *G06Q 10/1093* | (2023.01) |
| *G07C 9/00* | (2020.01) |
| *G07C 9/10* | (2020.01) |
| *G07C 9/21* | (2020.01) |
| *G07C 9/22* | (2020.01) |
| *G07C 9/25* | (2020.01) |
| *G07C 9/27* | (2020.01) |
| *G07C 9/28* | (2020.01) |
| *G07C 9/29* | (2020.01) |
| *H04W 4/02* | (2018.01) |
| *H04W 4/80* | (2018.01) |
| *H04W 12/06* | (2021.01) |
| *H04W 12/08* | (2021.01) |
| *H04W 12/64* | (2021.01) |

(52) U.S. Cl.
CPC ..... *G06Q 10/1095* (2013.01); *G07C 9/00174* (2013.01); *G07C 9/00182* (2013.01); *G07C 9/00309* (2013.01); *G07C 9/00904* (2013.01); *G07C 9/10* (2020.01); *G07C 9/21* (2020.01); *G07C 9/22* (2020.01); *G07C 9/257* (2020.01); *G07C 9/27* (2020.01); *G07C 9/28* (2020.01); *G07C 9/29* (2020.01); *H04W 4/027* (2013.01); *H04W 4/80* (2018.02); *H04W 12/06* (2013.01); *H04W 12/64* (2021.01); *G07C 2009/00333* (2013.01); *G07C 2009/00357* (2013.01); *G07C 2009/00769* (2013.01); *G07C 2209/08* (2013.01); *G07C 2209/61* (2013.01); *G07C 2209/63* (2013.01)

(56) References Cited

U.S. PATENT DOCUMENTS

| | | | |
|---|---|---|---|
| 7,597,250 B2 | 10/2009 | Finn | |
| 7,756,002 B2 | 7/2010 | Batra et al. | |
| 7,881,746 B2 | 2/2011 | Desai | |
| 7,995,644 B2 | 8/2011 | Sahinoglu et al. | |
| 8,001,055 B2 * | 8/2011 | Weiss | G06Q 20/40145 |
| | | | 382/187 |
| 8,355,671 B2 | 1/2013 | Kramer et al. | |
| 8,430,310 B1 | 4/2013 | Ho et al. | |
| 8,478,360 B2 | 7/2013 | Soliman | |
| 8,736,438 B1 | 5/2014 | Vasquez et al. | |
| 8,913,599 B2 | 12/2014 | Gonikberg et al. | |
| 9,007,173 B2 | 4/2015 | Mcintyre et al. | |
| 9,058,702 B2 | 6/2015 | Chao et al. | |
| 9,357,381 B2 * | 5/2016 | Cho | H04W 12/02 |
| 9,367,978 B2 | 6/2016 | Sullivan | |
| 9,408,147 B2 | 8/2016 | Polo et al. | |
| 9,485,607 B2 | 11/2016 | Aarnio | |
| 9,501,884 B2 | 11/2016 | Mcintyre et al. | |
| 9,530,265 B2 | 12/2016 | Lee et al. | |
| 9,666,005 B2 | 5/2017 | Ellis et al. | |
| 9,721,404 B2 | 8/2017 | Muller | |
| 9,769,627 B2 | 9/2017 | Siswick et al. | |
| 9,830,443 B2 | 11/2017 | Mutz et al. | |
| 9,942,849 B1 | 4/2018 | Hariharan et al. | |
| 10,117,046 B2 | 10/2018 | Ledvina et al. | |
| 10,152,837 B1 | 12/2018 | Mallard | |
| 10,171,129 B1 | 1/2019 | Hammerschmidt et al. | |
| 10,182,309 B2 | 1/2019 | Mahasenan et al. | |
| 10,228,444 B2 | 3/2019 | Jonsson | |
| 10,229,548 B2 | 3/2019 | Daniel-wayman et al. | |
| 10,230,522 B1 | 3/2019 | Roths et al. | |
| 10,235,854 B2 | 3/2019 | Trani | |
| 10,356,553 B2 | 7/2019 | Sant et al. | |
| 10,486,646 B2 | 11/2019 | Ledvina et al. | |
| 10,567,034 B2 | 2/2020 | Hammerschmidt et al. | |
| 10,602,556 B2 | 3/2020 | Foster et al. | |
| 10,652,925 B2 | 5/2020 | Naguib et al. | |
| 10,660,037 B2 | 5/2020 | Hariharan et al. | |
| 10,728,244 B2 | 7/2020 | Trani et al. | |
| 10,759,389 B2 | 9/2020 | Ledvina et al. | |
| 10,819,029 B2 | 10/2020 | Amiri et al. | |
| 11,100,734 B2 | 8/2021 | Ahn et al. | |
| 11,164,411 B2 | 11/2021 | Kuenzi et al. | |
| 11,237,243 B2 | 2/2022 | Jonsson et al. | |
| 11,295,563 B2 | 4/2022 | Kuenzi et al. | |
| 11,405,784 B2 | 8/2022 | Pirch et al. | |
| 11,770,708 B2 | 9/2023 | Pirch et al. | |
| 11,825,292 B2 | 11/2023 | Pirch et al. | |
| 11,887,416 B2 | 1/2024 | Hoyer et al. | |
| 11,900,750 B2 | 2/2024 | Pirch et al. | |
| 11,902,784 B2 | 2/2024 | Pirch et al. | |
| 11,928,906 B2 | 3/2024 | Pirch et al. | |
| 11,955,723 B2 | 4/2024 | Pirch | |
| 2003/0204742 A1 | 10/2003 | Gupta et al. | |
| 2003/0232620 A1 | 12/2003 | Runkle et al. | |
| 2004/0250074 A1 | 12/2004 | Kilian-Kehr | |
| 2004/0266494 A1 | 12/2004 | Ruuska et al. | |
| 2005/0058107 A1 | 3/2005 | Salokannel et al. | |
| 2007/0149123 A1 | 6/2007 | Palin | |
| 2007/0149124 A1 | 6/2007 | Onozawa | |
| 2007/0288995 A1 | 12/2007 | Terada et al. | |
| 2008/0259846 A1 | 10/2008 | Gonikberg et al. | |
| 2008/0259896 A1 | 10/2008 | Sahinoglu et al. | |
| 2009/0147803 A1 | 6/2009 | Takayama | |
| 2010/0034375 A1 | 2/2010 | Davis et al. | |
| 2011/0187493 A1 | 8/2011 | Elfstroem et al. | |
| 2012/0266221 A1 | 10/2012 | Castelluccia et al. | |
| 2013/0217332 A1 * | 8/2013 | Altman | G06Q 20/3224 |
| | | | 455/3.01 |
| 2013/0225080 A1 | 8/2013 | Doss et al. | |
| 2013/0237148 A1 * | 9/2013 | McCann | H04W 48/10 |
| | | | 455/41.1 |
| 2013/0287211 A1 | 10/2013 | Rhelimi | |
| 2014/0070003 A1 | 3/2014 | Radicella | |
| 2014/0229385 A1 | 8/2014 | Neafsey | |
| 2014/0298398 A1 | 10/2014 | Neely | |
| 2014/0342667 A1 | 11/2014 | Aarnio | |
| 2014/0355582 A1 | 12/2014 | Kamath et al. | |
| 2015/0029010 A1 | 1/2015 | Wisnia | |
| 2015/0200706 A1 | 7/2015 | Bottazzi et al. | |
| 2015/0200925 A1 | 7/2015 | Lagerstedt et al. | |
| 2015/0310681 A1 | 10/2015 | Avery et al. | |
| 2015/0332532 A1 | 11/2015 | Lee et al. | |
| 2016/0014605 A1 | 1/2016 | Robinton et al. | |
| 2016/0055692 A1 | 2/2016 | Trani | |
| 2016/0086406 A1 | 3/2016 | Baumgarte | |
| 2016/0147988 A1 | 5/2016 | Mutz et al. | |
| 2016/0229689 A1 | 8/2016 | Kaanta et al. | |
| 2016/0234008 A1 | 8/2016 | Hekstra et al. | |
| 2016/0241559 A1 | 8/2016 | Trani et al. | |
| 2016/0241999 A1 | 8/2016 | Chin et al. | |
| 2016/0248782 A1 | 8/2016 | Troesch | |
| 2016/0267760 A1 | 9/2016 | Trani | |
| 2016/0278006 A1 | 9/2016 | Lee et al. | |
| 2016/0316500 A1 | 10/2016 | Aliyar | |
| 2016/0353233 A1 | 12/2016 | Yong et al. | |
| 2016/0358394 A1 | 12/2016 | Konicek et al. | |
| 2016/0360341 A1 | 12/2016 | Srivatsa et al. | |
| 2017/0004665 A1 | 1/2017 | Chang et al. | |

(56) References Cited

U.S. PATENT DOCUMENTS

| | | |
|---|---|---|
| 2017/0019765 A1 | 1/2017 | Hoyer et al. |
| 2017/0053467 A1 | 2/2017 | Meganck et al. |
| 2017/0070919 A1 | 3/2017 | Verger et al. |
| 2017/0074000 A1 | 3/2017 | Banvait |
| 2017/0151918 A1 | 6/2017 | Boesen |
| 2017/0153636 A1 | 6/2017 | Boesen |
| 2017/0158202 A1 | 6/2017 | Yang |
| 2017/0228953 A1 | 8/2017 | Lupovici |
| 2017/0232930 A1 | 8/2017 | Murar et al. |
| 2017/0236346 A1 | 8/2017 | Murar et al. |
| 2017/0236351 A1 | 8/2017 | Menard et al. |
| 2017/0301166 A1 | 10/2017 | Earles et al. |
| 2017/0303084 A1 | 10/2017 | Brückner |
| 2017/0330226 A1 | 11/2017 | Kuenzi et al. |
| 2017/0359689 A1 | 12/2017 | Chhabra et al. |
| 2018/0081025 A1 | 3/2018 | Jonsson et al. |
| 2018/0103030 A1 | 4/2018 | Einberg et al. |
| 2018/0124593 A1 | 5/2018 | Ricciato et al. |
| 2018/0144563 A1 | 5/2018 | Reymann |
| 2018/0162321 A1 | 6/2018 | Spiess |
| 2018/0225898 A1 | 8/2018 | Kirkland et al. |
| 2018/0234797 A1* | 8/2018 | Ledvina ............... B60R 25/24 |
| 2018/0310159 A1* | 10/2018 | Katz ..................... H04W 4/90 |
| 2018/0315262 A1 | 11/2018 | Love et al. |
| 2018/0365400 A1* | 12/2018 | Lopez-Hinojosa .... G06V 20/59 |
| 2019/0051072 A1 | 2/2019 | Okada |
| 2019/0052314 A1 | 2/2019 | Caruana |
| 2019/0061686 A1 | 2/2019 | Neuhoff et al. |
| 2019/0073468 A1 | 3/2019 | Kazerani et al. |
| 2019/0073846 A1 | 3/2019 | Kamkar et al. |
| 2019/0097317 A1 | 3/2019 | Di Nallo et al. |
| 2019/0098499 A1 | 3/2019 | Lerch et al. |
| 2019/0116619 A1 | 4/2019 | Hauck et al. |
| 2019/0135229 A1* | 5/2019 | Ledvina ............... H04L 63/18 |
| 2019/0266822 A1 | 8/2019 | Ruggieri et al. |
| 2020/0053689 A1 | 2/2020 | Mcqueen et al. |
| 2020/0106877 A1 | 4/2020 | Ledvina et al. |
| 2020/0150261 A1 | 5/2020 | Naguib et al. |
| 2020/0168017 A1 | 5/2020 | Prostko et al. |
| 2020/0238952 A1 | 7/2020 | Lindsay et al. |
| 2020/0259522 A1 | 8/2020 | Hammerschmidt et al. |
| 2020/0259896 A1* | 8/2020 | Sachs .................... H04W 12/04 |
| 2020/0314651 A1 | 10/2020 | Pirch et al. |
| 2020/0320188 A1 | 10/2020 | Graff et al. |
| 2020/0349785 A1 | 11/2020 | Kuenzi et al. |
| 2020/0351781 A1 | 11/2020 | Hariharan et al. |
| 2021/0142600 A1 | 5/2021 | Tiwari et al. |
| 2021/0352608 A1* | 11/2021 | Chun ..................... H04M 1/724 |
| 2021/0383624 A1 | 12/2021 | Hoyer et al. |
| 2022/0157106 A1 | 5/2022 | Pirch et al. |
| 2022/0172529 A1 | 6/2022 | Pirch et al. |
| 2022/0172536 A1 | 6/2022 | Pirch et al. |
| 2022/0189224 A1 | 6/2022 | Pirch et al. |
| 2022/0189228 A1 | 6/2022 | Pirch et al. |
| 2022/0189229 A1 | 6/2022 | Pirch et al. |
| 2022/0191700 A1 | 6/2022 | Jung et al. |
| 2022/0377555 A1 | 11/2022 | Pirch et al. |
| 2024/0096157 A1 | 3/2024 | Pirch et al. |
| 2024/0161558 A1 | 5/2024 | Hoyer et al. |

FOREIGN PATENT DOCUMENTS

| | | |
|---|---|---|
| AU | 2020249424 | 3/2023 |
| AU | 2020249425 A1 | 3/2023 |
| AU | 2019373730 A1 | 4/2023 |
| AU | 2020247109 B2 | 6/2023 |
| AU | 2020247388 B2 | 6/2023 |
| AU | 2020247386 | 7/2023 |
| AU | 2020247107 | 9/2023 |
| BR | 112012021937 | 6/2018 |
| CA | 3134738 | 2/2024 |
| CN | 101133343 A | 2/2008 |
| CN | 102150448 | 8/2011 |
| CN | 202703516 U | 1/2013 |
| CN | 103544746 A | 1/2014 |
| CN | 104063930 A | 9/2014 |
| CN | 104320156 | 1/2015 |
| CN | 104620552 A | 5/2015 |
| CN | 104661308 A | 5/2015 |
| CN | 105378648 | 3/2016 |
| CN | 105723043 A | 6/2016 |
| CN | 105931326 A | 9/2016 |
| CN | 106934887 | 7/2017 |
| CN | 107206966 A | 9/2017 |
| CN | 107730663 A | 2/2018 |
| CN | 108475447 | 8/2018 |
| CN | 108701177 | 10/2018 |
| CN | 108701382 A | 10/2018 |
| CN | 108702360 | 10/2018 |
| CN | 108778855 A | 11/2018 |
| CN | 109074618 A | 12/2018 |
| CN | 109076487 A | 12/2018 |
| CN | 109286649 | 1/2019 |
| CN | 111738377 A | 10/2020 |
| CN | 111738378 A | 10/2020 |
| CN | 113039823 A | 6/2021 |
| CN | 113614559 A | 11/2021 |
| CN | 113614797 A | 11/2021 |
| CN | 113614798 A | 11/2021 |
| CN | 113631947 A | 11/2021 |
| CN | 113678014 A | 11/2021 |
| CN | 116071857 A | 5/2023 |
| CN | 113614798 | 8/2023 |
| CN | 117037332 | 11/2023 |
| CN | 113614797 | 4/2024 |
| DE | 102017110144 A1 | 10/2018 |
| EP | 2355050 A2 | 8/2011 |
| EP | 2706720 A1 | 3/2014 |
| EP | 2617242 B1 | 10/2016 |
| EP | 3101874 A1 | 12/2016 |
| EP | 3118820 A1 | 1/2017 |
| EP | 3355281 A1 | 8/2018 |
| EP | 3376475 A1 | 9/2018 |
| EP | 3928111 A1 | 12/2021 |
| EP | 3928297 | 11/2023 |
| IN | 202117041715 A | 12/2021 |
| IN | 202117042210 A | 12/2021 |
| IN | 202117019181 A | 1/2022 |
| IN | 202117041276 A | 8/2022 |
| IN | 202117041409 A | 9/2022 |
| IN | 202117041414 A | 9/2022 |
| IN | 202117041712 A | 9/2022 |
| IN | 202117041714 A | 9/2022 |
| IN | 481348 | 12/2023 |
| IN | 525285 | 3/2024 |
| JP | H02186082 A | 7/1990 |
| JP | 2002334361 A | 11/2002 |
| JP | 2005320742 A | 11/2005 |
| JP | 2007066107 A | 3/2007 |
| JP | 2007102405 A | 4/2007 |
| JP | 2007316980 A | 12/2007 |
| JP | 2008205548 A | 9/2008 |
| JP | 2009075010 A | 4/2009 |
| JP | 2009127284 A | 6/2009 |
| JP | 2010079609 A | 4/2010 |
| JP | 2010126898 A | 6/2010 |
| JP | 2010226246 A | 10/2010 |
| JP | 2010277557 A | 12/2010 |
| JP | 2012511761 A | 5/2012 |
| JP | 2014227647 | 12/2014 |
| JP | 2015090583 A | 5/2015 |
| JP | 2015106266 A | 6/2015 |
| JP | 2015227594 A | 12/2015 |
| JP | 2016094801 A | 5/2016 |
| JP | 2017029701 A | 2/2017 |
| JP | 6205237 B2 | 9/2017 |
| JP | 2017538875 A | 12/2017 |
| JP | 2018071213 | 5/2018 |
| JP | 6419202 B2 | 10/2018 |
| JP | 2018178506 A | 11/2018 |
| JP | 2018206355 A | 12/2018 |
| JP | 2018537017 | 12/2018 |
| JP | 2019528387 A | 10/2019 |
| JP | 2020510567 A | 4/2020 |

(56) References Cited

FOREIGN PATENT DOCUMENTS

| | | | |
|---|---|---|---|
| JP | 2022506040 | A | 1/2022 |
| JP | 2022526155 | A | 5/2022 |
| JP | 2022526335 | A | 5/2022 |
| JP | 2022526336 | A | 5/2022 |
| JP | 2022526337 | A | 5/2022 |
| JP | 2022527064 | A | 5/2022 |
| JP | 2022527065 | A | 5/2022 |
| JP | 2022528637 | A | 6/2022 |
| JP | 7213967 | B2 | 1/2023 |
| JP | 7225431 | B2 | 2/2023 |
| JP | 7228056 | B2 | 2/2023 |
| JP | 7241909 | B2 | 3/2023 |
| JP | 2023054074 | A | 4/2023 |
| JP | 2023071643 | A | 5/2023 |
| JP | 2023071680 | A | 5/2023 |
| JP | 2023080067 | A | 6/2023 |
| JP | 7389816 | | 11/2023 |
| JP | 7391987 | | 11/2023 |
| JP | 7395609 | | 12/2023 |
| JP | 7395610 | | 12/2023 |
| JP | 7408858 | | 12/2023 |
| JP | 2024014972 | | 2/2024 |
| JP | 7467702 | | 4/2024 |
| JP | 7480378 | | 5/2024 |
| KR | 101077406 | B1 | 10/2011 |
| KR | 20170040240 | A | 4/2017 |
| KR | 20170140367 | | 12/2017 |
| KR | 20180087429 | | 8/2018 |
| KR | 20190023713 | A | 3/2019 |
| KR | 102592842 | | 10/2023 |
| KR | 102612414 | | 12/2023 |
| KR | 102650075 | | 3/2024 |
| KR | 102650599 | | 3/2024 |
| KR | 102651436 | | 3/2024 |
| KR | 102651437 | | 3/2024 |
| KR | 102663726 | | 4/2024 |
| KR | 102669171 | | 5/2024 |
| MX | PA03010049 | A | 12/2004 |
| MX | 2021011587 | | 7/2023 |
| WO | WO-2013178163 | A1 | 12/2013 |
| WO | WO-2014016695 | A2 | 1/2014 |
| WO | 2014109033 | | 7/2014 |
| WO | WO-2016007627 | A1 | 1/2016 |
| WO | WO-2016059451 | A1 | 4/2016 |
| WO | WO-2016089837 | A1 | 6/2016 |
| WO | 2017058925 | | 4/2017 |
| WO | WO-2017136725 | A1 | 8/2017 |
| WO | WO-2017144345 | A1 | 8/2017 |
| WO | WO-2017181132 | A2 | 10/2017 |
| WO | WO-2018071671 | A2 | 4/2018 |
| WO | WO-2018091660 | A1 | 5/2018 |
| WO | WO-2018148687 | A1 | 8/2018 |
| WO | WO-2019016599 | A1 | 1/2019 |
| WO | WO-2019224329 | A1 | 11/2019 |
| WO | 2020066202 | | 4/2020 |
| WO | WO-2020089484 | A1 | 5/2020 |
| WO | WO-2020193566 | A1 | 10/2020 |
| WO | WO-2020193568 | A1 | 10/2020 |
| WO | WO-2020193570 | A1 | 10/2020 |
| WO | WO-2020193576 | A1 | 10/2020 |
| WO | WO-2020193577 | A1 | 10/2020 |
| WO | WO-2020193578 | A1 | 10/2020 |
| WO | WO-2020193580 | A1 | 10/2020 |

OTHER PUBLICATIONS

Ran, Moshe et al. Ultra-wideband radio-over-optical fiber: Technologies and applications. 2008 IEEE International Conference on Ultra-Wideband. https://ieeexplore.ieee.org/stamp/stamp.jsp?tp=&arnumber=4653438 (Year: 2008).*

Wilhelm, Matthias et al. Secure Key Generation in Sensor Networks Based on Frequency-Selective Channels. IEEE Journal on Selected Areas in Communications, vol. 31, Issue: 9. https://ieeexplore.ieee.org/stamp/stamp.jsp?tp=&arnumber=6584937 (Year: 2013).*

"Korean Application Serial No. 10-2021-7030781, Response Filed Sep. 20, 2023 to Notice of Preliminary Rejection mailed Jul. 20, 2023", with machine English translation, No Amendments to Claims, 16 pages.

"Korean Application Serial No. 10-2021-7030765, Response Filed Sep. 21, 2023 to Notice of Preliminary Rejection mailed Jul. 28, 2023", with English claims, 26 pages.

"Korean Application Serial No. 10-2021-7030699, Response Filed Sep. 25, 2023 to Notice of Preliminary Rejection mailed Jul. 28, 2023", with English claims, 31 pages.

"Korean Application Serial No. 10-2021-7030785, Response Filed Oct. 4, 2023 to Notice of Preliminary Rejection mailed Jul. 28, 2023", with English claims, 30 pages.

"U.S. Appl. No. 17/994,839, Notice of Allowability mailed Oct. 27, 2023", 2 pgs.

"U.S. Appl. No. 17/593,180, Notice of Allowance mailed Oct. 30, 2023", 9 pgs.

"U.S. Appl. No. 17/309,102, Corrected Notice of Allowability mailed Nov. 1, 2023", 5 pgs.

"U.S. Appl. No. 17/593,180, Supplemental Notice of Allowability mailed Nov. 8, 2023", 2 pgs.

"U.S. Appl. No. 17/593,174, Notice of Allowability mailed Nov. 9, 2023", 2 pgs.

"U.S. Appl. No. 17/593,180, Supplemental Notice of Allowability mailed Nov. 16, 2023", 2 pgs.

"U.S. Appl. No. 17/593,174, Notice of Allowability mailed Nov. 17, 2023", 2 pgs.

"U.S. Appl. No. 18/507,275, Preliminary Amendment filed Nov. 13, 2023", 10 pgs.

"U.S. Appl. No. 17/309,102, Supplemental Notice of Allowability mailed Nov. 20, 2023", 2 pgs.

"Chinese Application Serial No. 202080023684.0, Response Filed Nov. 10, 2023 to Decision of Rejection mailed Jul. 27, 2023", with English claims, 10 pages.

"European Application Serial No. 20714988.1, Communication Pursuant to Article 94(3) EPC mailed Nov. 29, 2023", 6 pgs.

"European Application Serial No. 20714987.3, Communication Pursuant to Article 94(3) EPC mailed Dec. 6, 2023", 5 pgs.

"Korean Application Serial No. 10-2021-7030782, Notice of Preliminary Rejection mailed Nov. 23, 2023", with English translation, 9 pages.

"U.S. Appl. No. 17/593,336, Supplemental Notice of Allowability mailed Dec. 21, 2023", 2 pgs.

"Korean Application Serial No. 10-2021-7030696, Response filed Nov. 20, 2023 to Notice of Preliminary Rejection mailed Sep. 19, 2023", with English claims, 26 pages.

"U.S. Appl. No. 18/399,309, Preliminary Amendment filed Dec. 28, 2023", 7 pgs.

"U.S. Appl. No. 17/593,180, Supplemental Notice of Allowability mailed Jan. 4, 2024", 2 pgs.

"U.S. Appl. No. 17/593,340, Notice of Allowance mailed Jan. 10, 2024", 5 pgs.

"Indian Application Serial No. 202117041715, Hearing Notice mailed Jan. 17, 2024", 3 pgs.

Google, "Google: "core java android companion BluetoothLeDeviceFilter.java—platform frameworks base—Git at Google"", Android Core Code, Bluetooth Companion, (Jan. 1, 2017), 9 pages.

"Chinese Application Serial No. 202080023684.0, Decision of Rejection mailed Jul. 27, 2023", with English translation, 17 pages.

"Korean Application Serial No. 10-2021-7030765, Notice of Preliminary Rejection mailed Jul. 28, 2023", with English translation, 16 pages.

"Japanese Application Serial No. 2021-557178, Response Filed Aug. 4, 2023 to Final Notification of Reasons for Refusal mailed May 9, 2023", with English claims, 10 pages.

"Japanese Application Serial No. 2021-557179, Response Filed Aug. 4, 2023 to Notification of Reasons for Rejection mailed May 9, 2023", with English claims, 9 pages.

"Korean Application Serial No. 10-2021-7030699, Notice of Preliminary Rejection mailed Jul. 28, 2023", with English translation, 11 pages.

(56) References Cited

OTHER PUBLICATIONS

"U.S. Appl. No. 17/593,342, Supplemental Notice of Allowability mailed Aug. 22, 2023", 2 pgs.
"Korean Application Serial No. 10-2021-7030785, Notice of Preliminary Rejection mailed Jul. 28, 2023", with English translation, 11 pages.
"European Application Serial No. 22198344.8, Response Filed Aug. 11, 2023 Extended European Search Report mailed Jan. 5, 2023", No Claim Amendments, 8 pgs.
"Australian Application Serial No. 2020247107, Response Filed Aug. 14, 2023 to Subsequent Examiners Report mailed Jun. 22, 2023", 13 pgs.
"Canadian Application Serial No. 3,134,864, Office Action mailed Aug. 23, 2023", 3 pgs.
"Canadian Application Serial No. 3,134,749, Examiners Rule 86(2) Report mailed Sep. 13, 2023", 4 pgs.
"Canadian Application Serial No. 3,134,867, Examiners Rule 86(2) Report mailed Sep. 13, 2023", 5 pgs.
"Australian Application Serial No. 2023200489, First Examination Report mailed Sep. 11, 2023", 3 pgs.
"U.S. Appl. No. 17/593,338, Corrected Notice of Allowability mailed Sep. 21, 2023", 3 pgs.
"U.S. Appl. No. 17/593,180, Response filed Sep. 22, 2023 to Final Office Action mailed Jul. 27, 2023", 10 pgs.
"U.S. Appl. No. 17/309,102, Response filed Sep. 22, 2023 to Final Office Action mailed Jul. 25, 2023", 12 pgs.
"Chinese Application Serial No. 201980073003.9, Office Action mailed Sep. 1, 2023", with English translation, 25 pages.
"Korean Application Serial No. 10-2021-7030696, Notice of Preliminary Rejection mailed Sep. 19, 2023", with English translation, 6 pages.
"U.S. Appl. No. 17/593,336, Notice of Allowance mailed Oct. 2, 2023", 5 pgs.
"U.S. Appl. No. 17/593,180, Advisory Action mailed Oct. 6, 2023", 3 pgs.
"U.S. Appl. No. 17/593,340, Response filed Oct. 11, 2023 to Non Final Office Action mailed Jul. 12, 2023", 9 pgs.
"Canadian Application Serial No. 3,134,931, Office Action mailed Oct. 5, 2023", 3 pgs.
"U.S. Appl. No. 17/593,180, Response filed Oct. 18, 2023 to Advisory Action mailed Oct. 6, 2023", 10 pgs.
"U.S. Appl. No. 17/309,102, Notice of Allowance mailed Oct. 19, 2023", 7 pgs.
"Japanese Application Serial No. 2023-005052, Notification of Reasons for Refusal mailed Oct. 17, 2023", with English translation, 16 pages.
"U.S. Appl. No. 17/593,338, Corrected Notice of Allowability mailed Oct. 20, 2023", 2 pgs.
U.S. Appl. No. 17/309,102, filed Apr. 23, 2021, Systems, Methods, and Devices For Access Control.
U.S. Appl. No. 16/828,001 U.S. Pat. No. 11,405,784, filed Mar. 24, 2020, Physical Access Control Systems With Localization-Based Intent Detection.
U.S. Appl. No. 17/812,426, filed Jul. 13, 2022, Physical Access Control Systems With Localization-Based Intent Detection.
U.S. Appl. No. 17/593,174, filed Sep. 10, 2021, Ultra-Wide Band Device for Access Control Reader System.
U.S. Appl. No. 17/593,180, filed Sep. 10, 2021, Ultra-Wide Band Device for Access Control Reader System.
U.S. Appl. No. 17/593,336, filed Sep. 15, 2021, Reader Coordination for Access Control.
U.S. Appl. No. 17/593,338, filed Sep. 15, 2021, Physical Access Control Systems With Localization-Based Intent Detection.
U.S. Appl. No. 17/593,340, filed Sep. 15, 2021, Physical Access Control Systems With Localization-Based Intent Detection.
U.S. Appl. No. 17/593,342, filed Sep. 15, 2021, Physical Access Control Systems With Localization-Based Intent Detection.
"U.S. Appl. No. 16/828,001, Non Final Office Action mailed Feb. 17, 2022", 10 pgs.
"U.S. Appl. No. 16/828,001, Notice of Allowance mailed Jun. 8, 2022", 10 pgs.
"U.S. Appl. No. 16/828,001, Response filed May 16, 2022 to Non Final Office Action mailed Feb. 17, 2022", 13 pgs.
"U.S. Appl. No. 17/309,102, Final Office Action mailed Jul. 25, 2023", 10 pgs.
"U.S. Appl. No. 17/309,102, Non Final Office Action mailed Mar. 28, 2023", 10 pgs.
"U.S. Appl. No. 17/309,102, Preliminary Amendment Filed Apr. 23, 2021", 8 pgs.
"U.S. Appl. No. 17/309,102, Response filed Jun. 26, 2023 to Non Final Office Action mailed Mar. 28, 2023", 11 pgs.
"U.S. Appl. No. 17/593,174 Preliminary Amendment filed Sep. 10, 2021", 7 pgs.
"U.S. Appl. No. 17/593,174, Non Final Office Action mailed Apr. 27, 2023", 11 pgs.
"U.S. Appl. No. 17/593,180 Preliminary Amendment filed Sep. 10, 2021", 6 pgs.
"U.S. Appl. No. 17/593,180, Final Office Action mailed Jul. 27, 2023", 14 pgs.
"U.S. Appl. No. 17/593,180, Non Final Office Action mailed Mar. 2, 2023", 15 pgs.
"U.S. Appl. No. 17/593,180, Response filed May 24, 2023 to Non Final Office Action mailed Mar. 2, 2023", 12 pgs.
"U.S. Appl. No. 17/593,336 Preliminary Amendment filed Sep. 15, 2021", 8 pgs.
"U.S. Appl. No. 17/593,336, Non Final Office Action mailed Apr. 3, 2023", 12 pgs.
"U.S. Appl. No. 17/593,336, Response filed Jun. 28, 2023 to Non Final Office Action mailed Apr. 3, 2023", 12 pgs.
"U.S. Appl. No. 17/593,338 Preliminary Amendment filed Sep. 15, 2021", 6 pgs.
"U.S. Appl. No. 17/593,338, Non Final Office Action mailed Dec. 20, 2022", 10 pgs.
"U.S. Appl. No. 17/593,338, Notice of Allowance mailed Jun. 14, 2023", 10 pgs.
"U.S. Appl. No. 17/593,338, Response filed Mar. 1, 2023 to Non Final Office Action mailed Dec. 20, 2022", 12 pgs.
"U.S. Appl. No. 17/593,338, Supplemental Notice of Allowability mailed Jul. 6, 2023", 3 pgs.
"U.S. Appl. No. 17/593,340 Preliminary Amendment filed Sep. 15, 2021", 7 pgs.
"U.S. Appl. No. 17/593,340, Non Final Office Action mailed Jul. 12, 2023", 8 pgs.
"U.S. Appl. No. 17/593,342, Non Final Office Action mailed Jan. 25, 2023", 12 pgs.
"U.S. Appl. No. 17/593,342, Notice of Allowance mailed May 10, 2023", 5 pgs.
"U.S. Appl. No. 17/593,342, Response filed Apr. 12, 2023 to Non Final Office Action mailed Jan. 25, 2023", 13 pgs.
"U.S. Appl. No. 17/593,342, Supplemental Notice of Allowability mailed May 22, 2023", 2 pgs.
"U.S. Appl. No. 17/593,342, Supplemental Notice of Allowability mailed Aug. 1, 2023", 2 pgs.
"U.S. Appl. No. 17/812,426, Non Final Office Action mailed Mar. 2, 2023", 10 pgs.
"U.S. Appl. No. 17/812,426, Notice of Allowance mailed May 8, 2023", 10 pgs.
"U.S. Appl. No. 17/812,426, Preliminary Amendment Filed Jul. 13, 2022", 12 pgs.
"U.S. Appl. No. 17/812,426, Response filed Apr. 19, 2023 to Non Final Office Action mailed Mar. 2, 2023", 9 pgs.
"Australia Application Serial No. 2020247107, Response Filed May 22, 2023 to Subsequent Examiners Report mailed Feb. 28, 2023", No Amendments to Claims, 3 pgs.
"Australia Application Serial No. 2020247107, Subsequent Examiners Report mailed Feb. 28, 2023", 3 pgs.
"Australian Application Serial No. 2019373730, First Examination Report mailed Apr. 11, 2022", 4 pgs.
"Australian Application Serial No. 2019373730, Response Filed Dec. 1, 2022 to Subsequent Examiners Report mailed Sep. 21, 2022", 18 pgs.

(56) References Cited

OTHER PUBLICATIONS

"Australian Application Serial No. 2019373730, Response Filed Aug. 26, 2022 to First Examination Report mailed Apr. 11, 2022", 15 pgs.
"Australian Application Serial No. 2019373730, Subsequent Examiners Report mailed Sep. 21, 2022", 7 pgs.
"Australian Application Serial No. 2020247107, First Examination Report mailed Sep. 13, 2022", 4 pgs.
"Australian Application Serial No. 2020247107, Response Filed Jan. 31, 2023 to First Examination Report mailed Sep. 13, 2022", 15 pgs.
"Australian Application Serial No. 2020247107, Subsequent Examiners Report mailed Jun. 22, 2023", 3 pgs.
"Australian Application Serial No. 2020247109, First Examination Report mailed Jun. 21, 2022", 3 pgs.
"Australian Application Serial No. 2020247109, Response Filed Jan. 31, 2023 to Subsequent Examiners Report mailed Oct. 28, 2022", 8 pgs.
"Australian Application Serial No. 2020247109, Response Filed Oct. 3, 2022 to First Examination Report mailed Jun. 21, 2022", 10 pgs.
"Australian Application Serial No. 2020247109, Subsequent Examiners Report mailed Oct. 28, 2022", pgs.
"Australian Application Serial No. 2020247386, First Examination Report mailed Aug. 30, 2022", 3 pgs.
"Australian Application Serial No. 2020247386, Response Filed Dec. 21, 2022 to First Examination Report mailed Aug. 30, 2022", 11 pgs.
"Australian Application Serial No. 2020247386, Response Filed Mar. 20, 2023 to Subsequent Examiners Report mailed Dec. 23, 2022", No Claim Amendments, 2 pgs.
"Australian Application Serial No. 2020247386, Response Filed May 29, 2023 to Subsequent Examiners Report mailed Apr. 13, 2023", No Amendments to Claims, 2 pgs.
"Australian Application Serial No. 2020247386, Subsequent Examiners Report mailed Apr. 13, 2023", 3 pgs.
"Australian Application Serial No. 2020247386, Subsequent Examiners Report mailed Dec. 23, 2022", 3 pgs.
"Australian Application Serial No. 2020247388, First Examination Report mailed Jul. 26, 2022", 3 pgs.
"Australian Application Serial No. 2020247388, Response Filed Jan. 31, 2023 to Subsequent Examiners Report mailed Nov. 17, 2022", 12 pgs.
"Australian Application Serial No. 2020247388, Response filed Oct. 26, 2022 to First Examination Report mailed Jul. 26, 2022", 120 pgs.
"Australian Application Serial No. 2020247388, Subsequent Examiners Report mailed Nov. 17, 2022", 3 pgs.
"Australian Application Serial No. 2020249420, First Examination Report mailed Jul. 12, 2022", 3 pgs.
"Australian Application Serial No. 2020249420, Response Filed Sep. 21, 2022 to First Examination Report mailed Jul. 12, 2022", 12 pgs.
"Australian Application Serial No. 2020249424, First Examination Report mailed Jul. 7, 2022", 3 pgs.
"Australian Application Serial No. 2020249424, Response filed Oct. 26, 2022 to First Examination Report mailed Jul. 7, 2022", 121 pgs.
"Australian Application Serial No. 2020249425, First Examination Report mailed Jul. 20, 2022", 3 pgs.
"Australian Application Serial No. 2020249425, Response filed Oct. 11, 2022 Filed to First Examination Report mailed Jul. 20, 2022", 9 pgs.
"Canadian Application Serial No. 3,070,588, Non Final Office Action mailed May 12, 2022", 4 pgs.
"Canadian Application Serial No. 3,070,588, Response Filed Sep. 8, 2022 to Non Final Office Action mailed May 12, 2022", 15 pgs.
"Canadian Application Serial No. 3,117,588, Examiners Rule 86(2) Requisition mailed Mar. 14, 2023", 7 pgs.
"Canadian Application Serial No. 3,117,588, Response Filed Jul. 6, 2023 to Examiners Rule 86(2) Requisition mailed Mar. 14, 2023", 28 pgs.
"Canadian Application Serial No. 3,134,738, Examiner's Rule 86(2) Requisition mailed Nov. 18, 2022", 4 pgs.
"Canadian Application Serial No. 3,134,738, Response filed Mar. 13, 2023 to Examiner's Rule 86(2) Requisition mailed Nov. 18, 2022", 10 pgs.
"Canadian Application Serial No. 3,134,749, Response filed Mar. 27, 2023 to Examiner's Rule 86(2) Report mailed Dec. 1, 2022", 10 pgs.
"Canadian Application Serial No. 3,134,751, Examiner's Rule 86(2) Requisition mailed Nov. 18, 2022", 5 pgs.
"Canadian Application Serial No. 3,134,751, Response filed Mar. 16, 2023 to Examiner's Rule 86(2) Requisition mailed Nov. 18, 2022", 13 pgs.
"Canadian Application Serial No. 3,134,864, Examiner's Rule 86(2) Requisition mailed Nov. 18, 2022", 4 pgs.
"Canadian Application Serial No. 3,134,864, Response filed Mar. 13, 2023 to Examiner's Rule 86(2) Requisition mailed Nov. 18, 2022", 7 pgs.
"Canadian Application Serial No. 3,134,866, Examiner's Rule 86(2) Requisition mailed Nov. 18, 2022", 4 pgs.
"Canadian Application Serial No. 3,134,866, Response filed Mar. 8, 2023 to Examiner's Rule 86(2) Requisition mailed Nov. 18, 2022", 8 pgs.
"Canadian Application Serial No. 3,134,867, Examiner's Rule 86(2) Requisition mailed Nov. 18, 2022", 4 pgs.
"Canadian Application Serial No. 3,134,867, Response Filed Mar. 9, 2023 to Examiner's Rule 86(2) Requisition mailed Nov. 18, 2022", No Claim Amendments, 10 pgs.
"Canadian Application Serial No. 3,134,931, Examiner's Rule 86(2) Requisition mailed Dec. 8, 2022", 3 pgs.
"Canadian Application Serial No. 3,134,931, Response Filed Apr. 3, 2023 to Examiner's Rule 86(2) Requisition mailed Dec. 8, 2022", 12 pgs.
"Canadian Application Serial No. 3,134,749, Examiner's Rule 86(2) Report mailed Dec. 1, 2022", 4 pgs.
"Chinese Application Serial No. 202020398075.0, Response filed Jan. 20, 2021 to Notification to Make Rectification mailed Nov. 5, 2020", w/o English claims, 40 pgs.
"Chinese Application Serial No. 202080022914.1, Office Action mailed Oct. 24, 2022", with English translation, 20 pages.
"Chinese Application Serial No. 202080022914.1, Response Filed Feb. 17, 2023 to Office Action mailed Oct. 24, 2022", with English claims, 12 pages.
"Chinese Application Serial No. 202080023684.0, Office Action mailed Mar. 22, 2023", with English translation, 15 pages.
"Chinese Application Serial No. 202080023684.0, Office Action mailed Sep. 30, 2022", with English translation, 23 pages.
"Chinese Application Serial No. 202080023684.0, Response Filed Jan. 29, 2023 to Office Action mailed Sep. 30, 2022", with English claims, 33 pages.
"Chinese Application Serial No. 202080023684.0, Response Filed Jun. 5, 2023 to Office Action mailed Mar. 22, 2023", with Concise Statement of Relevance, 4 pages.
"European Application Serial No. 19801788.1, Response to Communication pursuant to Rules 161(1) and 162 EPC filed Nov. 24, 2021", 18 pgs.
"European Application Serial No. 20714545.9, Communication Pursuant to Rule 114(2) EPC mailed Nov. 21, 2022", 53 pgs.
"European Application Serial No. 20714545.9, Communication Pursuant to Rule 114(2) EPC mailed Dec. 1, 2022", 7 pgs.
"European Application Serial No. 20714545.9, Response filed Apr. 12, 2022 to Communication Pursuant to Rule 161(1) and 162 EPC mailed Oct. 5, 2021", 77 pgs.
"European Application Serial No. 20714984.0, Response filed Mar. 30, 2022 Communication Pursuant to Rules 161(1) and 162 EPC mailed Sep. 30, 2021", 40 pgs.
"European Application Serial No. 20714985.7, Response filed Apr. 12, 2022 to Communication Pursuant to Rules 161(1) and 162 EPC mailed Oct. 5, 2021", 18 pgs.

(56) References Cited

OTHER PUBLICATIONS

"European Application Serial No. 20714986.5, Communication Pursuant to Article 94(3) EPC mailed Jun. 30, 2023", 7 pgs.
"European Application Serial No. 20714986.5, Response filed Apr. 12, 2022 Communication Pursuant to Rule 161(1) and 162 EPC mailed Oct. 5, 2021", 30 pgs.
"European Application Serial No. 20714988.1, Response Filed Apr. 11, 2022 to Communication pursuant to Rules 161(1) and 162 EPC Filed Oct. 5, 2021", 20 pgs.
"European Application Serial No. 21210676.9, Extended European Search Report mailed Jan. 14, 2022", 7 pgs.
"European Application Serial No. 21210676.9, Voluntary Amendment filed on Aug. 4, 2022", 11 pgs.
"European Application Serial No. 22198344.8, Extended European Search Report mailed Jan. 5, 2023", 10 pgs.
"European Application Serial No. 20714987.3, Response filed Apr. 12, 2022 to Communication Pursuant to Rules 161(1) and 162 EPC mailed Oct. 5, 2021", 78 pgs.
"Google: core/java/android/companion/BluetoothLeDeviceFilter.java—platform/frameworks/base—Git at Google", Android Core Code, Bluetooth Companion, [Online] Retrieved from the Internet: <https://android.googlesource.com/platform/frameworks/base/+/master/core/java/android/companion/BluetoothLeDeviceFilter.java>, (Jan. 1, 2017), 9 pgs.
"Indian Application Serial No. 202117019181, First Examination Report mailed Feb. 22, 2022", w/ English Translation, 9 pgs.
"Indian Application Serial No. 202117019181, First Examination Report mailed Feb. 22, 2022", w/ English translation, 7 pgs.
"Indian Application Serial No. 202117019181, Response filed Aug. 22, 2022 to First Examination Report mailed Feb. 22, 2022", with English claims, 22 pages.
"Indian Application Serial No. 202117041276, First Examination Report mailed Aug. 29, 2022", with English translation, 5 pages.
"Indian Application Serial No. 202117041276, Response Filed Feb. 28, 2023 to First Examination Report mailed Aug. 29, 2022", with English claims, 19 pages.
"Indian Application Serial No. 202117041409, First Examination Report mailed Sep. 7, 2022", with English translation, 6 pages.
"Indian Application Serial No. 202117041409, Response Filed Mar. 7, 2023 to First Examination Report mailed Sep. 7, 2022", with English claims, 17 pages.
"Indian Application Serial No. 202117041409; Voluntary Amendment Filed Mar. 7, 2023", with English claims, 11 pages.
"Indian Application Serial No. 202117041414, First Examination Report mailed Sep. 5, 2022", with English translation, 6 pages.
"Indian Application Serial No. 202117041414, Response Filed Mar. 3, 2023 to First Examination Report mailed Sep. 5, 2022", with English claims, 23 pages.
"Indian Application Serial No. 202117041414, Voluntary Amendment Filed Mar. 3, 2023", with English claims, 11 pages.
"Indian Application Serial No. 202117041712, First Examination Report mailed Sep. 8, 2022", with English translation, 5 pages.
"Indian Application Serial No. 202117041712, Response Filed Mar. 7, 2023 to First Examination Report mailed Sep. 8, 2022", with English claims, 16 pages.
"Indian Application Serial No. 202117041714, First Examination Report mailed Sep. 7, 2022", with English translation, 8 pages.
"Indian Application Serial No. 202117041714, Response Filed Mar. 7, 2023 to First Examination Report mailed Sep. 7, 2022", with English claims, 17 pages.
"Indian Application Serial No. 202117041715, First Examination Report mailed Mar. 15, 2022", w/ English Translation, 8 pgs.
"Indian Application Serial No. 202117041715, Response Filed Sep. 9, 2022 to First Examination Report mailed Mar. 15, 2022", with English claims, 9 pages.
"Indian Application Serial No. 202117041715, Voluntary Amendment Filed Sep. 15, 2022", with English claims, 70 pages.
"Indian Application Serial No. 202117042210, First Examination Report mailed Mar. 17, 2022", w/ English Translation, 5 pgs.
"Indian Application Serial No. 202117042210, Response Filed Sep. 16, 2022 to First Examination Report mailed Mar. 17, 2022", with English claims, 11 pages.
"Indian Application Serial No. 202117042210, Voluntary Amendment Filed Sep. 15, 2022", with English claims, 12 pages.
"International Application Serial No. PCT/EP2019/080113, International Preliminary Report on Patentability mailed May 14, 2021", 7 pgs.
"International Application Serial No. PCT/EP2019/080113, International Search Report mailed Feb. 7, 2020", 4 pgs.
"International Application Serial No. PCT/EP2019/080113, Written Opinion mailed Feb. 7, 2020", 5 pgs.
"International Application Serial No. PCT/EP2020/058197, International Preliminary Report on Patentability mailed Oct. 7, 2021", 10 pgs.
"International Application Serial No. PCT/EP2020/058197, International Search Report mailed Jul. 28, 2020", 5 pgs.
"International Application Serial No. PCT/EP2020/058197, Written Opinion mailed Jul. 28, 2020", 8 pgs.
"International Application Serial No. PCT/EP2020/058199, International Preliminary Report on Patentability mailed Sep. 28, 2021", 8 pgs.
"International Application Serial No. PCT/EP2020/058199, International Search Report mailed Jun. 8, 2020", 5 pgs.
"International Application Serial No. PCT/EP2020/058199, Written Opinion mailed Jun. 8, 2020", 7 pgs.
"International Application Serial No. PCT/EP2020/058201, International Preliminary Report on Patentability mailed Oct. 7, 2021", 10 pgs.
"International Application Serial No. PCT/EP2020/058201, International Search Report mailed Jun. 26, 2020", 5 pgs.
"International Application Serial No. PCT/EP2020/058201, Written Opinion mailed Jun. 26, 2020", 8 pgs.
"International Application Serial No. PCT/EP2020/058210, International Preliminary Report on Patentability mailed Oct. 7, 2021", 15 pgs.
"International Application Serial No. PCT/EP2020/058210, International Search Report mailed Jun. 29, 2020", 4 pgs.
"International Application Serial No. PCT/EP2020/058210, Written Opinion mailed Jun. 29, 2020", 13 pgs.
"International Application Serial No. PCT/EP2020/058216, International Preliminary Report on Patentability mailed Sep. 28, 2021", 9 pgs.
"International Application Serial No. PCT/EP2020/058216, International Search Report mailed Jun. 26, 2020", 5 pgs.
"International Application Serial No. PCT/EP2020/058216, Written Opinion mailed Jun. 26, 2020", 8 pgs.
"International Application Serial No. PCT/EP2020/058218, International Preliminary Report on Patentability mailed Sep. 28, 2021", 7 pgs.
"International Application Serial No. PCT/EP2020/058218, International Search Report mailed Jun. 15, 2020", 5 pgs.
"International Application Serial No. PCT/EP2020/058218, Written Opinion mailed Jun. 15, 2020", 6 pgs.
"International Application Serial No. PCT/EP2020/058221, International Preliminary Report on Patentability mailed Oct. 7, 2021", 12 pgs.
"International Application Serial No. PCT/EP2020/058221, International Search Report mailed Jun. 29, 2020", 5 pgs.
"International Application Serial No. PCT/EP2020/058221, Written Opinion mailed Jun. 29, 2020", 10 pgs.
"Japanese Application Serial No. 2021-523189, Notification of Reasons for Refusal mailed Jul. 12, 2022", with English translation, 14 pages.
"Japanese Application Serial No. 2021-523189, Response Filed Oct. 5, 2022 to Notification of Reasons for Refusal mailed Jul. 12, 2022", with English claims, 21 pages.
"Japanese Application Serial No. 2021-557174, Notification of Reasons for Refusal mailed Apr. 18, 2023", with English translation, 10 pages.
"Japanese Application Serial No. 2021-557174, Notification of Reasons for Refusal mailed Nov. 1, 2022", with English translation, 8 pages.

(56) References Cited

OTHER PUBLICATIONS

"Japanese Application Serial No. 2021-557174, Response Filed Jan. 18, 2023 to Notification of Reasons for Refusal mailed Nov. 1, 2022", with English claims, 17 pages.
"Japanese Application Serial No. 2021-557174, Response Filed Jul. 12, 2023 to Notification of Reasons for Refusal mailed Apr. 18, 2023", with English claims, 11 pages.
"Japanese Application Serial No. 2021-557175, Notification of Reasons for Refusal mailed Sep. 27, 2022", with English translation, 6 pages.
"Japanese Application Serial No. 2021-557175, Response Filed Dec. 19, 2022 to Notification of Reasons for Refusal mailed Sep. 27, 2022", with English claims, 16 pages.
"Japanese Application Serial No. 2021-557176, Notification of Reasons for Refusal mailed Nov. 1, 2022", with English translation, 12 pages.
"Japanese Application Serial No. 2021-557176, Response Filed Jan. 18, 2023 to Notification of Reasons for Refusal mailed Nov. 1, 2022", with English claims, 15 pages.
"Japanese Application Serial No. 2021-557177, Notification of Reasons for Refusal mailed Sep. 27, 2022", with English translation, 18 pages.
"Japanese Application Serial No. 2021-557177, Response Filed Dec. 16, 2022 to Notification of Reasons for Refusal mailed Sep. 27, 2022", with English claims, 16 pages.
"Japanese Application Serial No. 2021-557178, Final Notification of Reasons for Refusal mailed May 9, 2023", with English translation, 4 pages.
"Japanese Application Serial No. 2021-557178, Notification of Reasons for Refusal mailed Oct. 18, 2022", with English translation, 9 pages.
"Japanese Application Serial No. 2021-557178, Request Filed Jan. 13, 2023 to Notification of Reasons for Refusal mailed Oct. 18, 2022", with English claims, 16 pages.
"Japanese Application Serial No. 2021-557179, Notification of Reasons for Refusal mailed Oct. 18, 2022", with English translation, 10 pages.
"Japanese Application Serial No. 2021-557179, Notification of Reasons for Rejection mailed May 9, 2023", with English translation, 6 pages.
"Japanese Application Serial No. 2021-557179, Response Filed Jan. 13, 2023 to Notification of Reasons for Refusal mailed Oct. 18, 2022", with English claims, 18 pages.
"Japanese Application Serial No. 2021-557180, Final Notification of Reasons for Refusal mailed Apr. 18, 2023", with English translation, 8 pages.
"Japanese Application Serial No. 2021-557180, Notification of Reasons for Refusal mailed Nov. 1, 2022", with English translation, 10 pages.
"Japanese Application Serial No. 2021-557180, Response Filed Jan. 18, 2023 to Notification of Reasons for Refusal mailed Nov. 1, 2022", with English claims, 19 pages.
"Korean Application Serial No. 10-2021-7013164, Notice of Preliminary Rejection mailed Mar. 31, 2023", with English translation, 13 pages.
"Korean Application Serial No. 10-2021-7013164, Response Filed May 30, 2023 to Notice of Preliminary Rejection mailed Mar. 31, 2023", with English claims, 35 pages.
"Korean Application Serial No. 10-2021-7030781, Notice of Preliminary Rejection mailed Jul. 20, 2023", with English translation, 11 pages.
Angelico, Bruno, "Ultra-wideband Performance in a Dense Multipath Environment with Time and Spatial Diversity", 16th IST Mobile and Wireless Communications Summit, [Online]. Retrieved from the Internet: <https://ieeexplore.ieee.org/stamp/stamp.jsp?tp=&arnumber=4299254>, (2007), 5 pgs.
Canadeo, C. M, et al., "Code selection for enhancing UWB multiple access communication performance using TH-PPM and DS-BPSK modulations", 2003 IEEE Wireless Communications and Networking, WCNC 2003, [Online] Retrieved from the internet: <https://ieeexplore.ieee.org/stamp/stamp.jsp?tp=&arnumber=1200432> (Year: 2003), (2003), 678-682.
Drutarovsky, Milos, et al., "Real-Time Wireless UWB Sensor Network for Person Monitoring", 2017 14th International Conference on Telecommunications (ConTEL), [Online] Retrieved from the internet: <https://ieeexplore.ieee.org/stamp/stamp.jsp?tp=&arnumber=8000034>, (2017), 19-26.
Hu, Sanming, et al., "Measurements of UWB Antennas Backscattering Characteristics for RFID Systems", 2007 IEEE International Conference on Ultra-Wideband, [Online] Retrieved from the internet: <https://ieeexplore.ieee.org/stamp/stamp.jsp?tp=&arnumber=4380922>, (2007), 94-99.
Huang, Jingjing, et al., "Secret Key Generation Exploiting Ultra-wideband Indoor Wireless Channel Characteristics", IEEE Military Communications Conference, [Online]. Retrieved from the Internet: <https://1eeexplore.ieee.org/stamp/stamp.jsp?tp=&arnumber=6735631>, (2013), 5 pgs.
Madiseh, Ghoreishi M, "Verification of Secret Key Generation from UWB Channel Observations", IEEE International Conference on Communications, [Online]. Retrieved from the Internet: <https://ieeexplore.ieee.org/stamp/stamp.jsp?tp=&arnumber=5199564>, (2009), 5 pgs.
Miri, Jamel, "Privacy group distance bounding protocol on TH-UWB based NTRU public key cryptosystem", Sixth International Conference on Communications and Networking, [Online]. Retrieved from the Internet: <https://ieeexplore.ieee.org/stamp/stamp.jsp?tp=&arnumber=8285598>, (2017), 7 pgs.
Ranganathan, Aanjhan, et al., "Are We Really Close? Verifying Proximity in Wireless Systems", in IEEE Security & Privacy, vol. 15, No. 3, (May/Jun. 2017), 7 pgs.
Rousselot, Jerome, et al., "WideMac: a low power and routing friendly MAC protocol for Ultra Wideband sensor networks", IEEE International Conference on Ultra-Wideband, [Online]. Retrieved from the Internet: <https://ieeexplore.ieee.org/stamp/stamp.jsp?tp=&arnumber=4653427>, (2008), 4 pgs.
Somayazulu, V S, "Multiple access performance in UWB systems using time hopping vs. direct sequence spreading", IEEE Wireless Communications and Networking Conference Record, [Online]. Retrieved from the Internet: <https://ieeexplore.ieee.org/stamp/stamp.jsp?tp=&arnumber=993322>, (2002), 4 pgs.
"Chinese Application Serial No. 202020398075.0, Office Action mailed Aug. 11, 2020", with English translation, 3 pages.
"Chinese Application Serial No. 202020396956.9, Office Action mailed Aug. 11, 2020", with English translation, 3 pages.
"Chinese Application Serial No. 202020396956.9, Notification to Make Rectification mailed Nov. 5, 2020", with Concise Statement of Relevance, 2 pages.
"Chinese Application Serial No. 202020398075.0, Notification to Make Rectification mailed Nov. 5, 2020", with Concise Statement of Relevance, 2 pages.
"Chinese Application Serial No. 202020396956.9, Response filed Jan. 20, 2021 to Notification to Make Rectification mailed Nov. 5, 2020", with Concise Statement of Relevance, 40 pages.
"Chinese Application Serial No. 202020396956.9, Notification to Make Rectification mailed Feb. 4, 2021", with Concise Statement of Relevance, 2 pages.
"Chinese Application Serial No. 202020396956.9, Response filed Apr. 12, 2021 to Notification to Make Rectification mailed Feb. 4, 2021", with Concise Statement of Relevance, 37 pages.
"Mexican Application Serial No. MX a 2021 011587, Office Action mailed Oct. 6, 2021", with machine English translation, 7 pages.
"Mexican Application Serial No. MX a 2021 011591, Office Action mailed Oct. 6, 2021", with machine English translation, 7 pages.
"Mexican Application Serial No. MX a 2021 011595, Office Action mailed Oct. 6, 2021", with machine English translation, 7 pages.
"Mexican Application Serial No. MX a 2021 011639, Office Action mailed Oct. 11, 2021", with machine English translation, 7 pages.
"Mexican Application Serial No. MX a 2021 011638, Office Action mailed Oct. 11, 2021", with machine English translation, 7 pages.
"Mexican Application Serial No. MX a 2021 011640, Office Action mailed Oct. 11, 2021", with machine English translation, 7 pages.

(56) References Cited

OTHER PUBLICATIONS

"Mexican Application Serial No. MX a 2021 011636, Office Action mailed Oct. 11, 2021", with machine English translation, 7 pages.
"Japanese Application Serial No. 2021-557180, Response Filed Jul. 14, 2023 to Final Notification of Reasons for Refusal mailed Apr. 18, 2023", with English claims, 10 pages.
"U.S. Appl. No. 17/593,174, Response filed Jul. 27, 2023 to Non Final Office Action mailed Apr. 27, 2023", 10 pgs.
"Canadian Application Serial No. 3,134,864, Response Filed Dec. 13, 2023 to Office Action mailed Aug. 23, 2023", 6 pgs.
"U.S. Appl. No. 17/593,174, Corrected Notice of Allowability mailed Feb. 1, 2024", 2 pgs.
"Canadian Application Serial No. 3,134,931, Response filed Jan. 29, 2024 to Office Action mailed Oct. 5, 2023", 14 pgs.
"European Application Serial No. 20714986.5, Communication Pursuant to Article 94(3) EPC mailed Feb. 6, 2024", 4 pgs.
"Chinese Application Serial No. 202080023684.0, Response Filed Jan. 16, 2024 to Consultation by Telephone In Person-Response Needed filed Jan. 16, 2024", with English claims, 7 pages.
"Korean Application Serial No. 10-2021-7030781, Final Office Action mailed Jan. 30, 2024", with English translation, 5 pages.
"Canadian Application Serial No. 3,134,749, Response Filed Jan. 8, 2024 to Examiners Rule 86(2) Report mailed Sep. 13, 2023", 9 pgs.
"Canadian Application Serial No. 3,134,867, Response Filed Jan. 9, 2024 to Examiners Rule 86(2) Report mailed Sep. 13, 2023", 3 pgs.
"Chinese Application Serial No. 201980073003.9, Response Filed Jan. 16, 2024 to Office Action mailed Sep. 1, 2023", with English claims, 16 pages.
"Chinese Application Serial No. 202080024366.6, Office Action mailed Jan. 31, 2024", with English translation, 20 pages.
"Japanese Application Serial No. 2023-019246, Notification of Reasons for Refusal mailed Feb. 20, 2024", with English translation, 12 pages.
"Australian Application Serial No. 2023200489, Response filed Feb. 29, 2024 to First Examination Report mailed Sep. 11, 2023", 84 pgs.
"Australian Application Seril No. 2023201391, First Examination Report mailed Feb. 21, 2024", 5 pgs.
"Japanese Application Serial No. 2023-005052, Response Filed Jan. 17, 2024 to Notification of Reasons for Refusal mailed Oct. 17, 2023", with English claims, 8 pages.
"Korean Application Serial No. 10-2021-7030782, Response Filed Jan. 23, 2024 to Notice of Preliminary Rejection mailed Nov. 23, 2023", with English claims, 15 pages.
"Chinese Application Serial No. 201980073003.9, Office Action mailed Feb. 29, 2024", with English translation, 8 pages.
"European Application Serial No. 23210850.6, Extended European Search Report mailed Apr. 3, 2024", 11 pgs.
"Chinese Application Serial No. 202080023759.5, Office Action mailed Mar. 7, 2024", with English translation, 18 pages.
"Canadian Application Serial No. 3,117,588, Examiners Rule 86(2) Requisition mailed Mar. 27, 2023", 4 pgs.
"European Application Serial No. 20714987.3, Response filed Mar. 28, 2024 to Communication Pursuant to Article 94(3) EPC mailed Dec. 6, 2023", 12 pgs.
"Chinese Application Serial No. 202080023681.7, Office Action mailed Mar. 9, 2024", with English translation, 23 pages.
"U.S. Appl. No. 17/593,340, Supplemental Notice of Allowability mailed Apr. 11, 2024", 2 pgs.
"U.S. Appl. No. 17/593,340, Notice of Allowability mailed May 22, 2024", 2 pgs.
"Chinese Application Serial No. 202080024366.6, Response filed May 28, 2024 to Office Action mailed Jan. 31, 2024", with English claims, 38 pages.
"U.S. Appl. No. 17/593,340, Supplemental Notice of Allowability mailed May 29, 2024", 2 pgs.
"Canadian Application Serial No. 3,134,931, Office Action mailed May 23, 2024", 3 pgs.
"U.S. Appl. No. 18/507,275, Response filed Jun. 11, 2024 to Non Final Office Action mailed Jun. 6, 2024", 8 pgs.
"European Application Serial No. 20714984.0, Communication Pursuant to Article 94(3) EPC mailed Jun. 12, 2024", 6 pgs.
"U.S. Appl. No. 18/507,275, Non Final Office Action mailed Jun. 6, 2024", 8 pgs.
"Mexican Application Serial No. MX a 2021 004981, Office Action mailed May 21, 2024", with machine English translation 8 pages.
"European Application Serial No. 20714545.9, Communication Pursuant to Article 94(3) EPC mailed Jul. 11, 2024", 9 pgs.
"Japanese Application Serial No. 2023-019246, Notification of Reasons for Refusal mailed Aug. 6, 2024", with English translation, 8 pages.
"Mexican Application Serial No. MX a 2021 011636, Office Action mailed Aug. 2, 2024", With English Machine Translation, 14 pgs.
"Australian Application Serial No. 2023201391, Subsequent Examination Report mailed Aug. 19, 2024", 3 pgs.
"Australian Application Serial No. 2023203748, First Examination Report mailed Aug. 22, 2024", 3 pgs.
"Chinese Application Serial No. 202010219642.6, Office Action mailed Jul. 16, 2024", w English translation, 30 pgs.
"Australian Application Seril No. 2023201391, Response Filed Jul. 31, 2024 to First Examination Report mailed Feb. 21, 2024", 85 pgs.
"Canadian Application Serial No. 3,134,931, Response filed Sep. 12, 2024 to Office Action mailed May 23, 2024", 11 pgs.
"Chinese Application Serial No. 202010220452.6, Office Action mailed Jul. 16, 2024", w English Translation, 25 pgs.

* cited by examiner

PHYSICAL ACCESS CONTROL SYSTEMS WITH LOCALIZATION-BASED INTENT DETECTION

CROSS-REFERENCE TO RELATED APPLICATION(S)

This is a continuation application of U.S. patent application Ser. No. 17/812,426, titled "Physical Access Control Systems with Localization-Based Intent Detection," filed Jul. 13, 2022, which is a continuation application of U.S. patent application Ser. No. 16/828,001, titled "Physical Access Control Systems with Localization-Based Intent Detection," filed Mar. 24, 2020, now U.S. Pat. No. 11,405,784, which claims the benefit of U.S. Prov. Pat. Appl. No. 62/823,341, filed on Mar. 25, 2019, each of which is hereby incorporated herein by reference in its entirety.

TECHNICAL FIELD

Embodiments described herein generally relate to physical access control systems and more specifically to physical access control systems having credential location detection capabilities.

BACKGROUND

Physical access to an area, such as through a doorway, may be controlled by an electronic physical access control system (PACS). A person may have a keycard or mobile device to provide their credentials to the PACS. The environment for the PACS may vary with the number of people that may be provided access and the number of entry points. For example, a building for a company may have a single point of entry which provides entry access for all employees. Within that building, there may be multiple offices and private meeting rooms which provide entry access for select employees. Another example may be a hotel which has many entry points for each room, but each room may only be accessed by a select individual.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
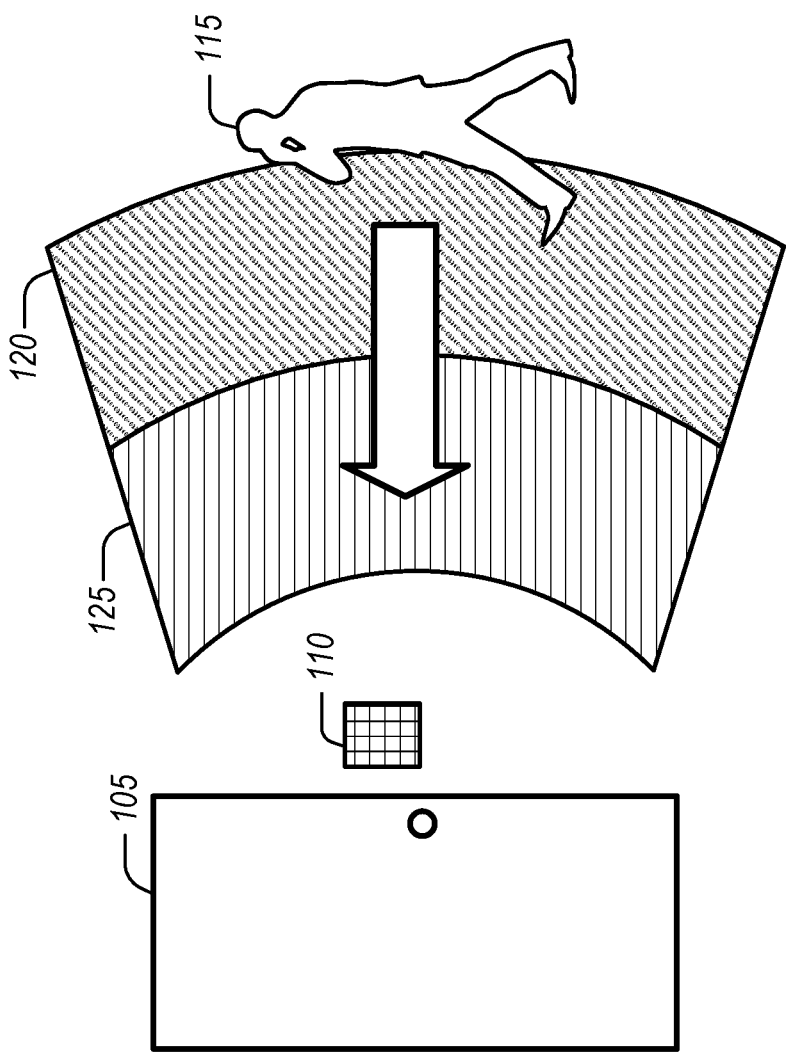
FIG. 1 illustrates an example of a user interacting with a PACS, in accordance with some embodiments.

When attempting to enter a secured area, a person may become frustrated by a delayed response between their approach to the entry point and the unlocking of the secure entry mechanism (e.g., an electronically controlled door lock). For example, an employee may pass through an entry point for a secure area multiple times a day. Additionally, in some conventional PACS, users may be required to physically present their credential (e.g., card/badge, or mobile device) to a reader located on the wall, which in some circumstances can inconvenience users or cause further unwanted delays, such as if the user's hands are full. As such, a PACS that is able to more easily and seamlessly identify the user (e.g., authenticate a user's permissions to end the secured area) can yield a more user-friendly and preferred experience. Further, users of an entry with a PACS may find benefit in a PACS that determines the intent of a user such that the PACS may perform preemptive credential verification such that the secure entry mechanism may be unlocked as the user approaches the entry point.

In some cases, the systems and methods described herein can permit a seamless experience by obtaining or receiving a credential from the user without requiring the user to actively present the device containing the credential (e.g., card or mobile device). That is, in some cases, the systems and methods described herein can include the credential being automatically sent (e.g., without active input from the user) to the reader when the user approaches the reader.

In some cases, the systems and methods described herein can implement various approaches to detect intent of the user such that the entry point will open not only when the user with a proper credential is in a defined vicinity of the entry point, but also once it is adequately determined that the authenticated user intend to cross through the entry point. A challenge with performing preemptive credential verification may be identifying false positives which would result in releasing the secure entry mechanism when it should not be unlocked (e.g., false intent detection). This is potentially problematic as an unauthorized person may gain access to the entry. For example, an authorized person may be walking down a hallway and pass by a secure entry point. If the PACS were to mis-identify the person's approach to the secure entry point, the PACS may unlock the secure entry mechanism. The person may pass by the door while another person may enter through the secure entry point while the secure entry mechanism is unlocked.

Wireless PACS may have generally used wireless communication technologies such as near field communications (NFC) such as radio-frequency identification (RFID) and personal area network (PAN) technologies, such as the IEEE 802.15.1 and Bluetooth Low Energy (BLE). These technologies may have drawbacks for a seamless user experience and entry. For example, the range of NFC is limited, such that a credential exchange typically does not occur until the user attempts to gain access (e.g., standing in front of the door, holding a keycard against the reader). The credential transfer to the reader and response by the host server may take several seconds, which results in a frustrating user experience. Further, the user generally may be required to remove the keycard or access device from their pocket, for example, and place it on or very near the reader for the process to begin.

BLE devices have a range of tens of meters (e.g., ten to twenty meters). Thus, credential exchange may be performed as the user approaches the reader. PAN standards may feature secure handshaking, encryption, and favorable energy profiles for discovery and data transmission. However, PAN standards do not offer accurate physical tracking of devices (e.g., ranging, positioning). Thus, it may be difficult for the reader to determine whether the intent of the user is to actually gain access to the secure area without any additional evidence of intent. Additional evidence of intent may include touching a door handle and gesturing with the key-device. However, this may still be a less than ideal user experience compared to a user simply walking up to the reader and gaining access to the secured area.

Ultra-wideband (UWB) wireless communication protocols may be used for communication by encoding data via time modulation (e.g., pulse-position encoding). With UWB, symbols are specified by pulses on a subset of time units out of a set of available time units. Other examples of UWB encodings may include amplitude modulation and polarity modulation. The wide band transmission tends to be more robust to multipath fading than carrier-based transmission techniques. Further, the lower power of pulses at any given frequency tend to reduce interference with carrier-based communication techniques.

UWB may be used in radar operations and provide localization accuracies on a scale of tens of centimeters. Due to the possibility of variable absorption and reflection of different frequencies in a pulse, both surface and obstructed (e.g., covered) features of an object may be detected. In some cases, the localization may provide an angle of incidence, in addition to providing a range or distance.

Physical access control may include a range of systems and methods for governing access, for example by people, to secure areas. Physical access control may include identification of authorized users or devices (e.g., vehicles, drones) and actuation of a gate, door, or other facility used to secure an area. PACS may include a reader (e.g., an online or offline reader) that holds authorization data and may be capable of determining whether the credentials provided are authorized for an actuator (e.g., door lock, door opener, turning off an alarm). An online reader or system may include a system which is connected to a network or the Internet for determining authorization. An offline reader or system may be a self-contained system which does not connect to any outside resources. For example, a PACS for a residential home may be offline.

PACS may include a host server to which readers and actuators (e.g., via a controller) are connected in a centrally managed configuration. In centrally managed configurations, readers may obtain credentials from key devices (e.g., a radio frequency identification (RFID) chip in a card, a fob, or a personal electronic device such as a mobile phone) and pass those credentials to the PACS host server. The host server may determine whether the credentials authorize access to the secure area and commands the actuator accordingly.

To address the issues with identifying intent, localization techniques (e.g., using secure UWB ranging) may be combined with PAN discovery and the key exchange. The key-device and the reader may coordinate secure ranging using a PAN technology. This may include the reader providing a secret (e.g., a scrambled time stamp (STS)) that is used to mark ranging messages to prevent spoofing. The key-device may provide the credentials during same PAN session in which the secret was shared. The reader may decrypt or otherwise prepare the credentials as it would normally do except that the credentials are cached until an intent trigger occurs.

The reader may use UWB to physically locate the key-device. In some examples, the UWB is activated after the secret is shared to conserve energy, which may be useful for battery powered readers or key-devices.

Identifying a physical location of a key-device with UWB may be more accurate than other techniques and may be accurate to the tens of centimeters, providing both range and direction to the reader. This accuracy surpasses the roughly ten-meter accuracy of PAN when readers are not coordinated. The precision of UWB accuracy may provide details needed for user intent determinations. For example, several zones may be defined, such as different ranges of distance from the reader, to provide different contexts for understanding user intent. Moreover, the accuracy of the tracking enables an accurate model of user motion from which intent may be discerned. Thus, the reader may categorize user motion as likely approaching the reader, or simply walking past.

An intent threshold or intent trigger may be in place, where once the likelihood of the intent exceeds the intent threshold, the intent trigger may activate a series of events, such as having the reader act on the cached credentials. For an offline reader, the reader may control the actuator (e.g., a lock on a disconnected door lock). In a centrally managed PACS, the reader may forward the credentials to the host server to act upon (e.g., sending credentials to a controller to make a determination and further actuate a door lock, as appropriate).

The systems and methods described herein may be implemented so that a first transmission or exchange with a key-device via a communication protocol with longer range capabilities, or in some cases with less accuracy (e.g., BLE, Wi-Fi), may be used to provide a user's credentials to a reader. Those credentials may be stored in a cached location within the reader until and unless, in a second transmission or exchange with the key-device via a communication protocol with increased accuracy and precision (e.g., UWB), it is determined that the user indeed intends to enter the secured area (e.g., open the door at which the reader is installed). Once the user's intent is determined, the reader may then release the credential (sometimes referred to as PACS bits) for processing, such as sending the credential to a controller to determine the user's access permissions, or to directly unlock the door (e.g., in an offline reader). This two-step authentication sequence may reduce computational time that may lead to delays in the door opening for a user (also referred to as latency). With this approach, the authentication and communication between the reader and the key device is effectively already performed by the time the system has determined that the user does intend to enter the door and the user reaches the door.

In some embodiments, if the intent trigger does not occur within a time-period, or an anti-intent trigger occurs—such as moving away from the reader—the cached credentials may be cleared. This may be performed as many credentials may be cached in the reader, but potentially a smaller subset of the cached credentials may actually be used in an authentication process (e.g., based on later predicted intent).

In some embodiments, if the reader has identified whether or not the credentials provide access to the secured area, such as with an offline reader, the credentials are not cached if it is determined the credentials do not provide access to the secured area. Additionally, the UWB localization may not be activated.

In some embodiments, the reader may include persistent authentication of the credential. The persistency may be based on a timeout value. The amount of time the credential is stored, or its persistency, is dependent on the timeout value. If the timeout is quite long, the need for re-exchanging PAN credentials is reduced.

For example, a key device is within PAN range to the reader. The reader may cache the PACS ID (e.g., 26 bit PACS for legacy systems) read from the credential provided by the key device. A seed to a time-based one-time password (TOTP) technique is generated by the reader and shared via PAN to the key device. The UWB ranging received from the key device comprises a TOTP that the reader verifies. If UWB ranges the key device close enough (within some meters) to the reader or other target (e.g., center of a door), the reader transmits the cached PACS ID to the host server. The host server triggers the door opening. The reader may then delete the cached PACS ID. Instead, if the UWB does not range the key device after some timeout (e.g., 5 min), the TOTP is invalid. The key device then has to connect to the reader to get a new TOTP. Additionally, after some authentication timeout (e.g., some hours), the PAN authentication may expire.

When using secure UWB localization, in order to effectively function in the system, any reader involved may require a seed or secret for secure ranging, such as STS. For example, if several readers may be connected (e.g., via BLE, a mesh network, etc.) to distribute the same secret across all participating readers. This potentially reduces the need for exchanging STS between each reader and key device. Further, this shared exchange may exchange the cached PACS IDs to all readers—e.g., from the one initial reader to which the key device connected. By doing so, one credential and STS exchange is needed for each key device.

A coordinated PACS may use a gateway device to coordinate several readers within a PACS, whether it is centrally managed or offline. The readers may operate as remote radio heads to the gateway, with the gateway performing the credential caching, intent determination, and credential forwarding to the host server or commanding the actuator to operate. A coordinated PACS facilitates UWB positioning of key devices with one or more of the connected readers. In some examples, the gateway may load balance UWB localization responsibilities. This may be helpful in dense key device scenarios, such as at ticketing speed-gates.

In some embodiments, the credentials being sent to a reader may include encoded or cryptographic information, such as SEOS® credentials by HID Global, MIFARE® DESFire® credentials by NXP, or FeliCa™ credentials by Sony stored in or on the key-device. The reader may decrypt or obtain various information from the credential received from the key-device and provide that information to the access server (e.g., controller) to determine permissions for the user, such as access permissions. In some cases, a reader may decrypt a credential and obtain access control identification information about the user (e.g., PACS bits), and send those to the controller to determine if the user has permission to access the controlled area or system for which they are attempting to gain access.

FIG. 1 illustrates an example 100 of a user interacting with a PACS, in accordance with some embodiments. A doorway 105 may be secured with an electronic lock that is controlled through a PACS. The PACS uses a reader 110 for receiving credentials from a user 115 that desires to enter the doorway 105.

As the user 115 approaches the doorway 105 and reader 110, a first wireless communication 120 communicates with a key device of the user 115. The first wireless communication 120 may be a low power communication such as BLE. The first wireless communication 120 may have capabilities to communicate with a key device at a greater distance, but may not be able to perform localization and ranging of the key device. Using the first wireless communication 120, the reader 110 may receive credentials and other identifying information from the key device. The reader 110 may cache the credentials or may transmit the credentials to a verification system of the PACS that may determine if the user 115 may enter the doorway 105.

As the user 115 continues to approach the doorway 105 and reader 110, a second wireless communication 125 begins communicating with the key device of the user 115. The second wireless communication 125 may be a higher power and advanced communication, such as UWB. The second wireless communication 125 may include localization and ranging to track the movement of the user 115. The second wireless communication 125 may track the user 115 and use factors such as the speed the user 115 is moving to determine if the intent of the user 115 is to enter the doorway 105. For example, if a user 115 is not intending to enter the doorway 115, then their speed may remain constant. Conversely, if the intent of the user 115 is to enter the doorway 105, then the user 115 may slow their pace as they approach the doorway 105 and reach for the door handle.

The PACS may use the data received from the reader 110 using the second wireless communication 125 to determine the likelihood or probability the user 115 is intending to pass through the doorway 105. The determination may be a calculation using the received data or the received data may be provided to a fixed or evolutive model. If the determined probability of intent exceeds a predetermined threshold, then the PACS may unlock the door such that the user 115 may seamlessly enter the doorway 105. The threshold may vary depending on how precise the probability determination is and how secure the doorway 105 may need to be. For example, a meeting room may have a threshold of 50% intent probability as there is no risk if it is unlocked for a false positive. However, a door for a laboratory for new product development may have a threshold of 90% for intent probability. Furthermore, using the system available user credential to associate additional information, such as but not limited to, access rights and access history, the threshold could be modulated per user.

FIGS. 2A-2D illustrate an example 200 for key devices interacting with the PACS, in accordance with some embodiments. The example 200 of the PACS includes a doorway 205 that is secured with a reader 210 and a lock 215. The reader includes a cache 220 for storing credentials and other data received from key devices. The reader 210 communicates with access control 225. Access control 225 may be a server that is connected to a local internal network.

Access control 225 may be remote systems connected through the internet for governing access to multiple locations.

Figure 2A:
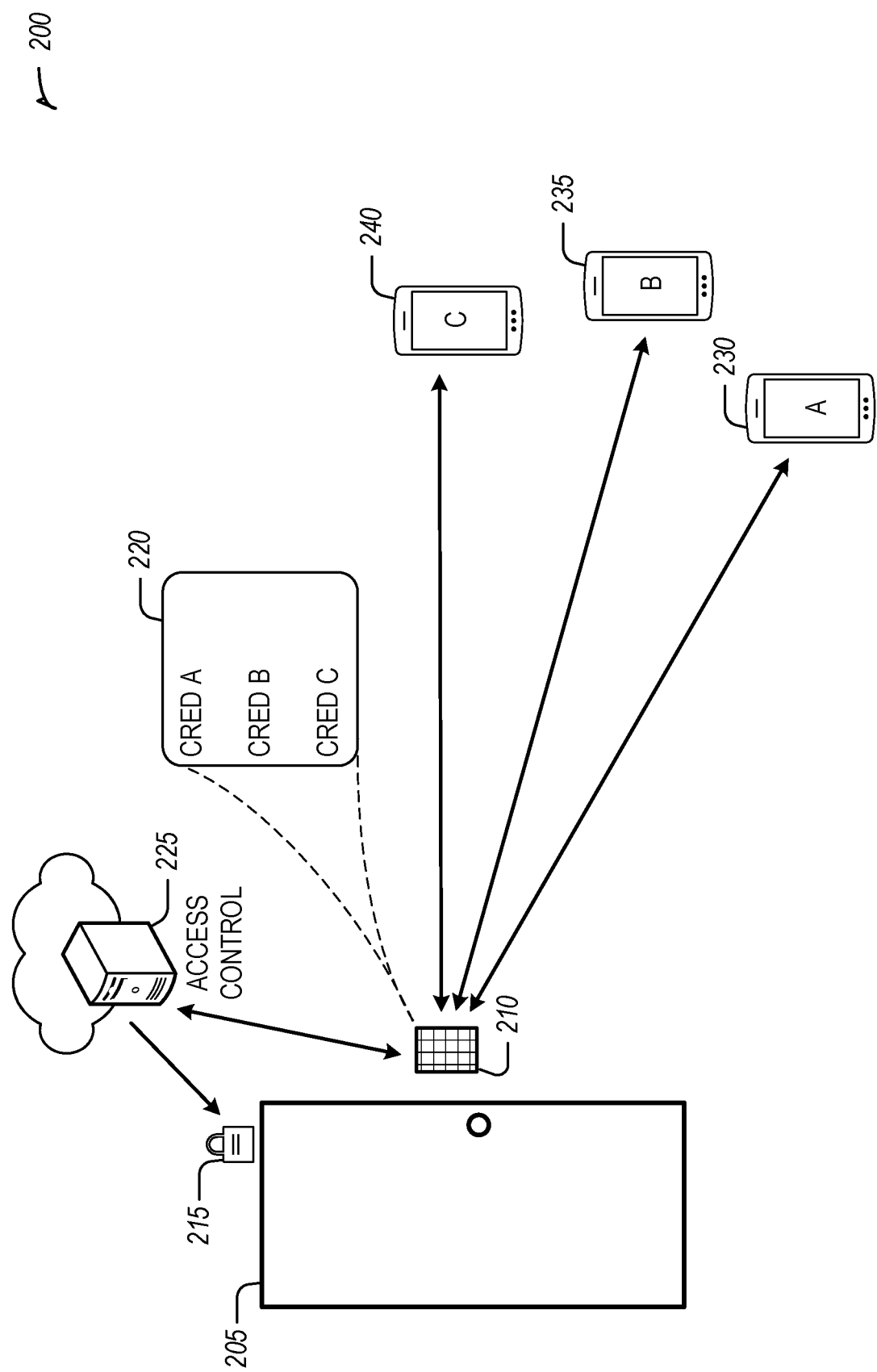
FIGS. 2A-2D illustrate an example for key devices interacting with the PACS, in accordance with some embodiments.

In FIG. 2A, key device A 230, key device B 235, and key device C 240 come within a BLE range (as an example of a low energy wireless communication) of the reader 210. In establishing the connection with the reader 210, each of key device A 230, key device B 235, and key device C 240 provide a credential to the reader 210.

Figure 2B:
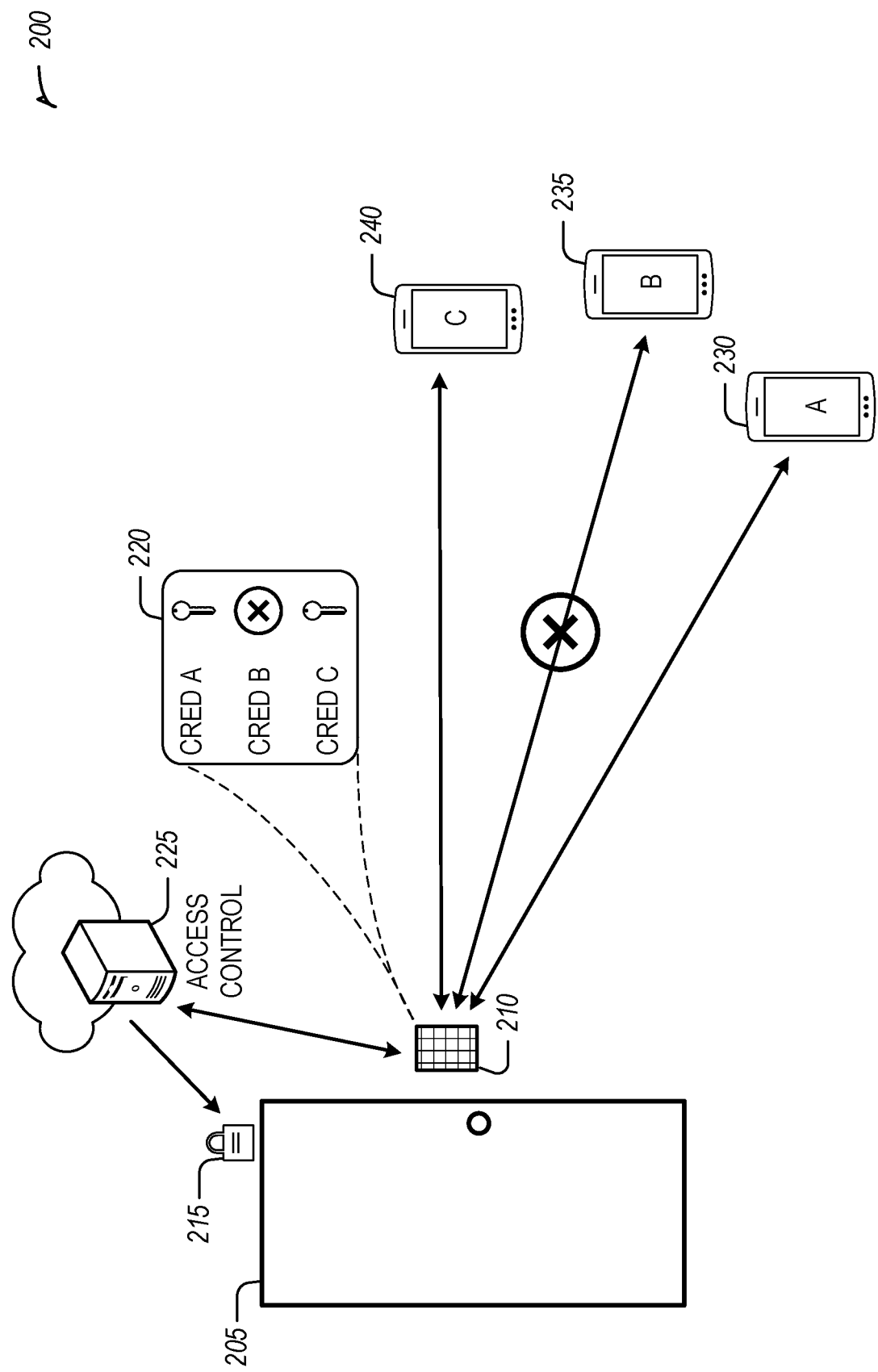

In FIG. 2B, the reader 210 may perform preliminary authentication of the credentials. For example, the reader 210 may include a blacklist or a white list to make an immediate decision about tracking a key device. Using UWB for ranging and localization provides additional information about the movement of the key device, but also requires more energy. Thus, it is advantageous if a determination may be made if a key device should be tracked or not. In the example 200 of FIG. 2B, the reader 210 determines that key device B 235 does not have the credentials to access doorway 205. Thus, the reader 210 does not range key device B 235 with UWB as key device B 235 would not be permitted to access doorway 205.

In some embodiments, the reader 210 may transmit the credential to the access control 225 for authorization. If the access control 225 determines that the credential associated with a key device is authorized for entry to the doorway 205 associated with reader 210, access control 225 may provide a token to the reader 210 for that credential. The reader 210 may store each token with their respective credential. Similarly, in this embodiment, if the reader 210 does not receive a token, then the credential is removed and the key device, such as key device B 235, is not tracked.

In some embodiments, the reader 210 may cache the credential when first received through BLE. The reader 210 may hold the credential in the cache until ranging occurs using UWB. Once the key device is within a certain range, the reader 210 may release the credential for authentication by access control 225 or an authentication server.

Figure 2C:
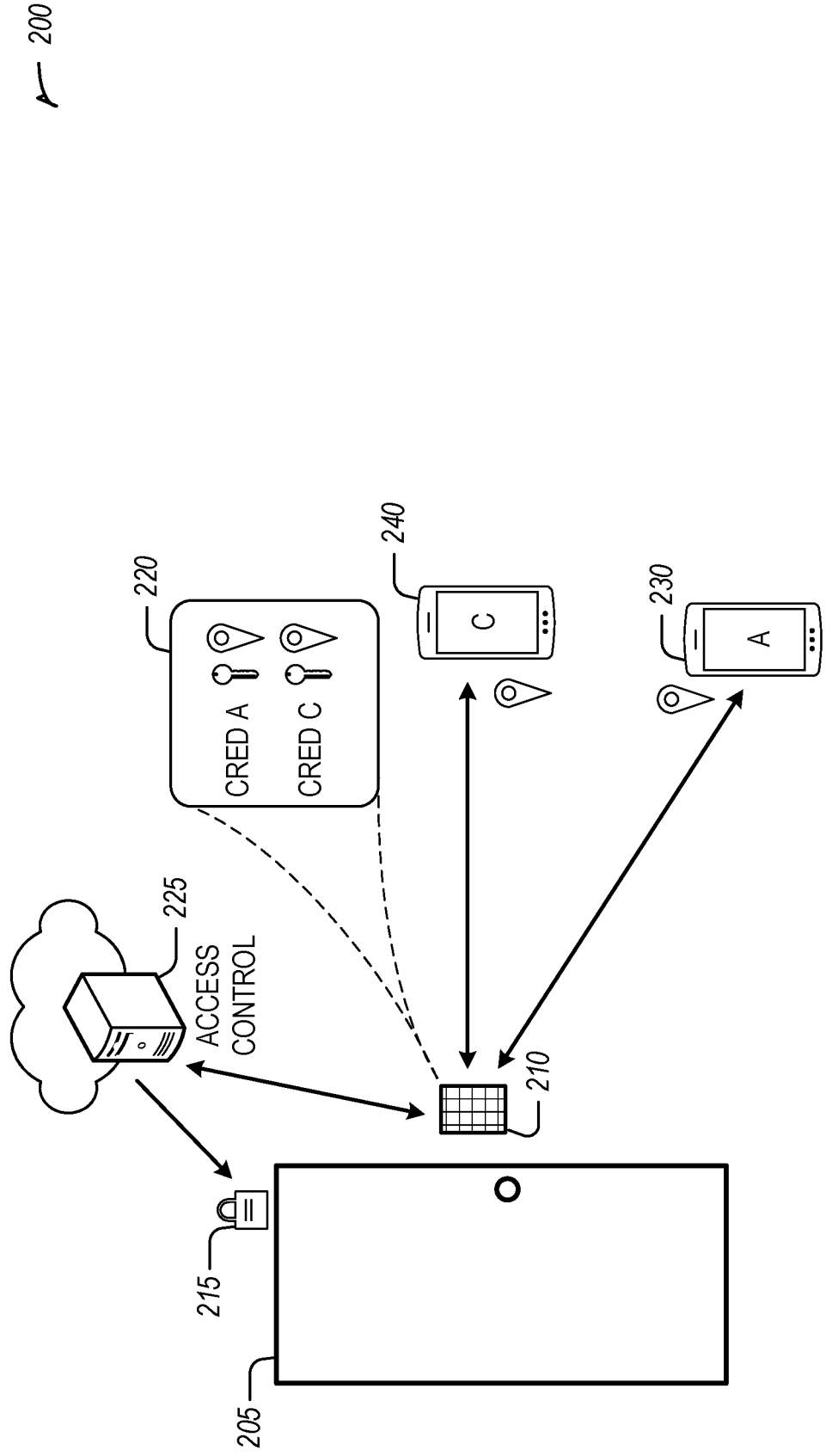

In FIG. 2C, key device A 230 and key device C 240 have moved closer to the reader 210 and UWB may be used for communication. With UWB, localization or ranging is possible. Location information for key device A 230 and key device C 240 is provided to reader 210. The location information may be used determine the intent of the person with each respective key device. The location information may be derived from UWB, such as by performing range detection.

Figure 2D:
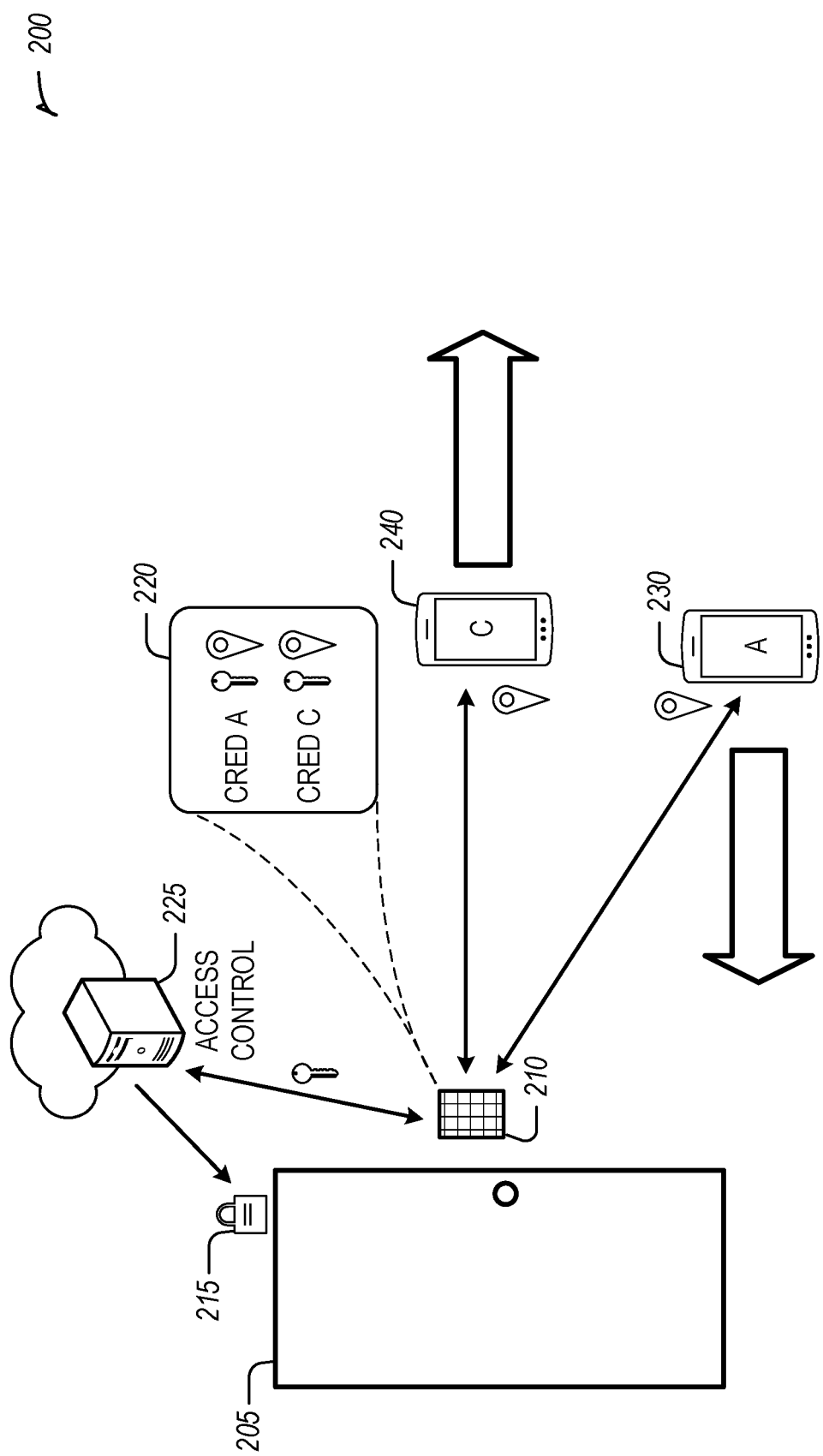

In FIG. 2D, key device A 230 and key device C 240 continue to move and the location information of their respective movement is provided to the reader 210 through the UWB communication. Key device C 240 moves away from the reader 210, and thus the determined intent of key device C 240 entering the doorway 205 is low. The reader 210 may continue tracking key device C 240 until it is out of range. The reader 210 may be battery conscious and hardware conscious to monitor how power and processing is used. This may include discarding credentials from the cache as soon as it is determined the credential is no longer needed, such as if the intent drops below a threshold value. Managing the credentials stored in the cache based on a confidence or intent for the person accessing the entry point may be essential for a PACS that manages a set of entry gates, such as a bank of turnstiles. This type of entry point may receive a large number of credentials at certain times, such as the entry for a subway or sporting arena.

Key device A 230 continues to approach the doorway 205, and thus the intent is high that key device A 230 will access the doorway 205. The reader 210 may release the token for key device A 230 to the access control 225. When access control 225 receives the token, access control 225 may transmit a command to the door lock 215 to unlock so that the person holding key device A 230 may enter doorway 205 with ease and no delay. If a token has not been provided, the reader may send the credential for key device A 230 to access control 225 to unlock the door lock 215. For an offline system, reader 210 may have direct control of door lock 215 and send the command directly to door lock 215 to unlock.

Many factors may be used to determine when the reader 210 should transmit the release, such as transmitting the token, to access control 225. If the doorway 205 is for a secure area, then the determined intent, or probability for accessing the doorway 205, may need to be very high, and thus have a high threshold, so that the doorway 205 is not inadvertently opened. Other factors, such as a frequency with which the person accesses the doorway 205 or known contextual data, such as a meeting that is about to start in the room of the doorway 205 may contribute to determining the threshold for intent.

For security, the reader 210 may generate session keys for communication with a key device, such as key device A 230. Each side, such as the reader 210 and key device A 230 may have a counter. This counter may be hashed as part of the session key. To track the movement of key device A 230, the reader 210 is continually communicating with the key device A 230 to determine the distance. With each communication, the reader 210 or key device A 230 may respectively increase the count for the hashed counter. The session key is then changed with each communication to prevent malicious attacks while the reader 210 and key device A 230 may continually communicate as each is aware of what the count should be and can decipher the hash.

Identifying the intent of entering a doorway by a person may be used to expedite the process of authenticating credentials and unlocking the doorway such that the person is not hindered by the process and is presented with what appears to be a seamless transition. The previous discussions have focused on identifying an intent for a single doorway. Challenges arise for identifying the intent when multiple doorways and multiple readers are present, as found in the examples of FIGS. 3 and 4.

Figure 3:
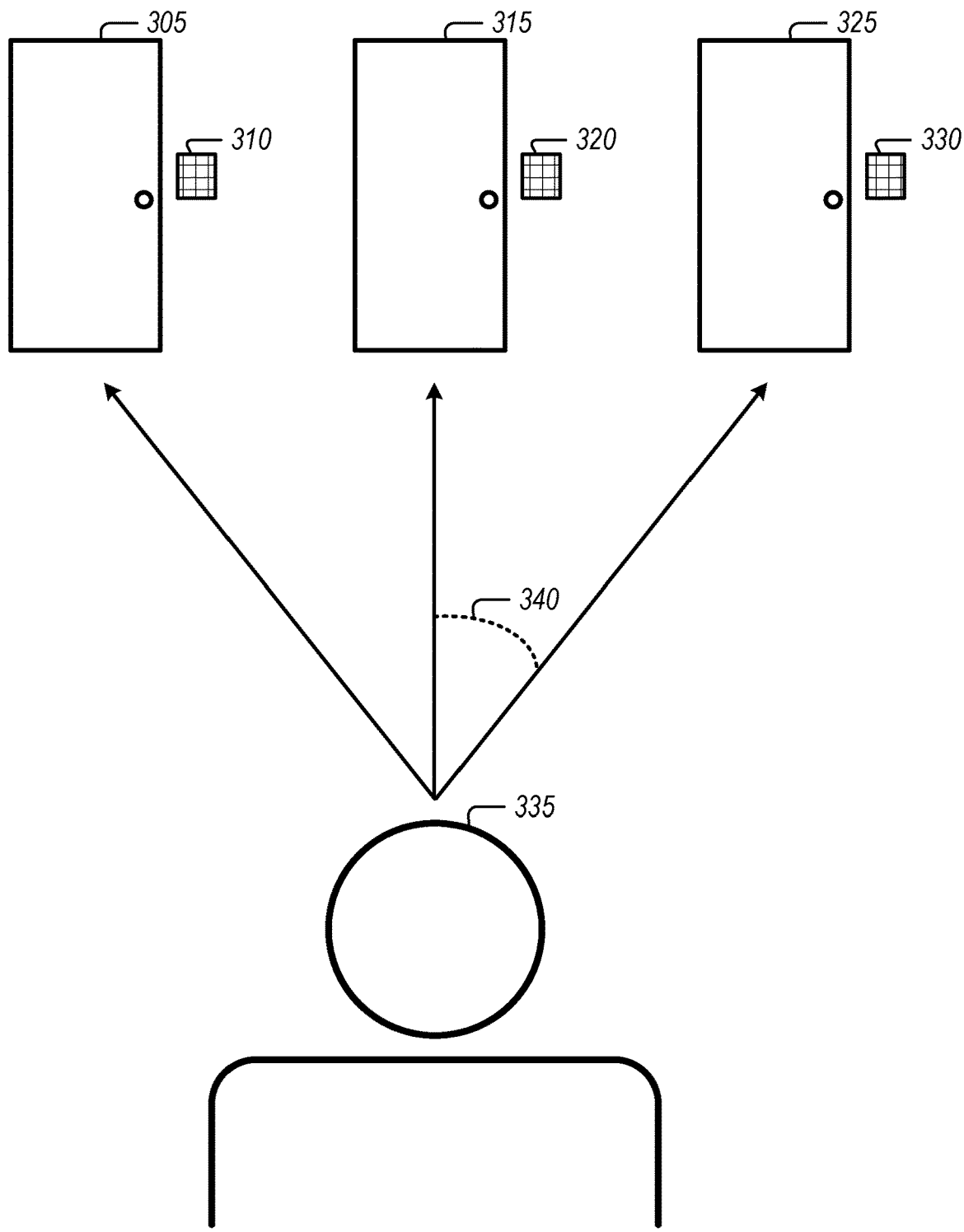
FIG. 3 illustrates an example of a person directly approaching three doorways, in accordance with some embodiments.

FIG. 3 illustrates an example 300 of a person 335 directly approaching three doorways, in accordance with some embodiments. A person 335 may approach a set of doorways that are directly in front of them. For each of doorway 305, doorway 315, and doorway 325 it may be difficult for the respective reader 310, reader 320, and reader 330 to identify which doorway the person 335 is intending to enter. For example, if reader 310, reader 320, and reader 330 are using ranging alone, the person 335 would be within relatively the same range of reach reader. Identifying the location of the person 335 and performing continuous localization of the person 335 (through their key device), may provide a direction the person 335 is moving. Using the determined direction, the readers may identify an angle of arrival 340. The angle of arrival 340 may be used to determine which doorway of multiple doorways that the person 335 is intending to enter.

Figure 4:
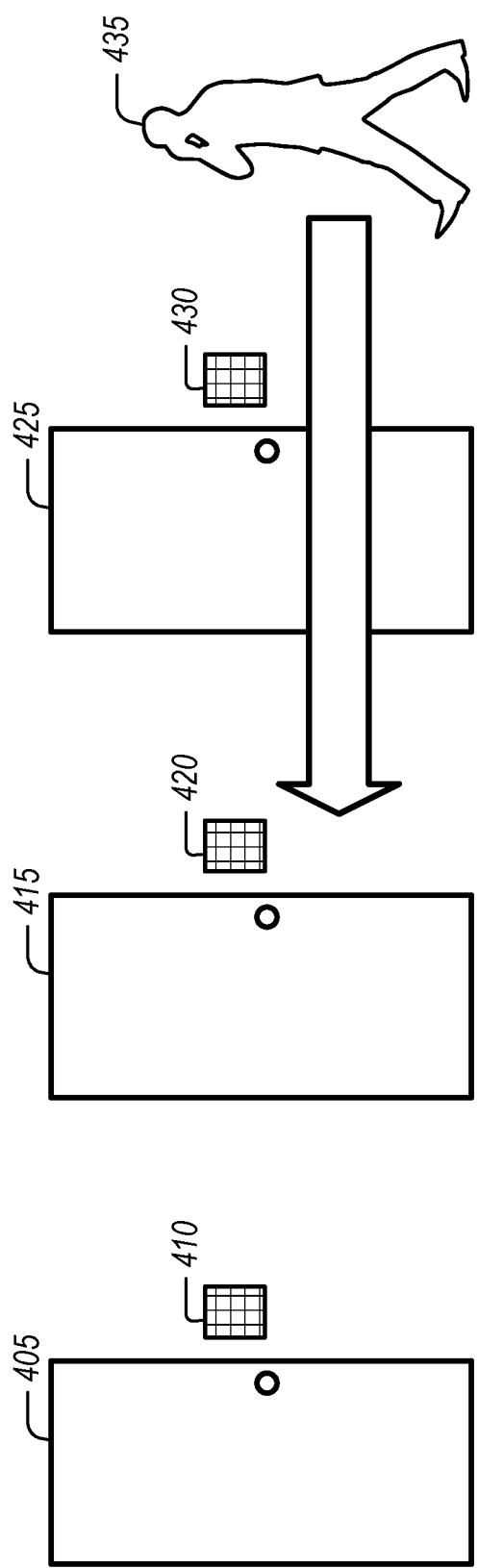
FIG. 4 illustrates an example of a person approaching three doorways, in accordance with some embodiments.

FIG. 4 illustrates an example 400 of a person 435 approaching three doorways, in accordance with some embodiments. A person 435 may approach a set of doorways that may be to a side of the person 435, such as if the person 435 were walking down a hallway in an office building. For each of doorway 405, doorway 415, and doorway 425 it may be difficult for the respective reader 410, reader 420, and reader 430 to identify which doorway the person 335 is intending to enter. While the person 435 is at different distances from each of reader 410, reader 420, and reader 430, the person 435 could stop at any one of the doorways.

As the person 435 moves down the hallway and passes a reader, such as passing reader 430 in example 400, then doorway 425 may be immediately removed from the possible doorways of intent. This may free the cache for reader 430 and change the probability for the person 435 intending to enter doorway 405 or doorway 415.

The PACS may attempt to monitor the speed with which person 435 is moving. The speed with which a person moves in such a scenario may be relatively constant until just before the person reaches their intended doorway, at which time their pace slows. This type of movement information may be used to identify the intended doorway. A neural network may be trained with movement data of how people move down a hallway and how their movement changes in relation to the doorway they enter. The neural network may be used with the PACS and the location data provided by the readers through UWB to identify the intended doorway.

In example 400, the PACS may use contextual data to identify the intended doorway. For example, the PACS may have access to the calendar system of a company. The PACS may identify a meeting is about to begin in the room corresponding to doorway 415. Thus, while the intended doorway of person 435 is indeterminable by movement alone, using the calendar, the PACS may determine the intent of person 435 is to enter doorway 415. The accuracy of the intent may be further improved if the PACS has access to the individuals that are invited to the meeting and then cross references the identification of person 435 (from their key device) with the list of invitees.

Another scenario of this example may be if doorway 405, doorway 415, and doorway 425 with reader 410, reader 420, and reader 430 were a hallway of a hotel. Identifying the intent of a guest may be less trivial as the guest would have credentials which only correspond to one doorway. Thus, as the guest walked down the hotel hallway the PACS of the hotel may anticipate the intent of the guest even before the guest is within range of the reader for their room, as the PACS may identify that there is only one doorway/room for which the guest has credentials to access.

The PACS may access communication systems such as email, instant messaging, and short message service (SMS) that may provide information used to determine the doorway a person intends to enter. For example, if John sends Bob an instant message asking Bob to meet John in Laboratory B, then when Bob approaches the doorways for the laboratories, the PACS may recognize that Bob intends to enter Laboratory B based on the request from John.

Different types of doorways or entry points may alter how the intent is utilized and when the readers transmits the release to the access control system. For example, the entry point may be a turnstile and if there is a large bank of turnstiles, then identifying the intended turnstile may not occur until the person has stepped into the turnstile. Types of doorways or entry points may include a manual lock, an automated lock, a manual door, an automated door, a turnstile, a transit speedgate, a parking gate, or an elevator.

The timing of the release of credentials and unlocking of the doorway may be determined by the data received through the ranging and localization performed through UWB. The intent may be altered by radii of distance from the reader. Different entry environments may alter this timing. For example, an open area of an office with multiple secured doorways may result in waiting until the key device is at a particular doorway before the release occurs as a high enough probability of intent is not able to be determined because of the multiple secured doorways. Conversely, the front door lock of a home may be released well before a person reaches it as there would be no other door to which that person has access.

The key device may be a mobile device, such as a smart phone or tablet. Devices such as a smart phone include different types of sensors that may provide information to the PACS. As the key device communicates with the reader and the PACS through the BLE and UWB wireless connections, data collected from the sensors on the key device may be transmitted to the reader and PACS. The key device may include sensors such as a gyroscope, accelerometer, barometer, global positioning system (GPS), microphone, and camera. The key device may collect information from communication protocols such as Wi-Fi and BLE. Data provided from these sensors and communication protocols may be used to determine the relative location, motion, and speed of the key device.

The sensor data may provide information for determining the intent of the person with the key device. For example, the PACS may determine that the key device is approaching a doorway quickly. Using the data provided from the gyroscope and accelerometer, the PACS may identify that the person is running. Based on the determination the person is running, different actions may be taken. In one scenario, if there is only one doorway that the person has credentials to access, then the PACS may unlock the door sooner as the person will reach the door faster than if they were walking. In another scenario, if the person has credentials for multiple meeting rooms, but using the calendar system the PACS identifies that a meeting started 10 minutes ago in one of the meeting rooms, the PACS may determine that meeting room is the intended destination based on the person running.

Data stored in the mobile device and data of the current functioning of the mobile device may be communicated to the PACS and used to determine intent. If the PACS is not connected to a calendar system, then the mobile device may provide information from the calendar or reminders in the mobile device. For example, a person that lives in an apartment building may share childcare responsibilities with another tenant and each has access to the other's apartment. The person may have a reminder to pick up the other tenant's child for school, which is used to identify the intent that the person will enter the other tenant's apartment.

The current functioning of the mobile device may be communicated to the PACS, such as if the person is talking on the mobile device or playing a game. For example, if a person is walking down a hallway while playing a game on their mobile device, it may be determined that an intent to enter a meeting room is low.

Cameras, noise sensors (microphones), and environmental sensors such as thermometers and barometers may be used to provide information for the PACS to identify intent. For example, a camera may be used to assist in identifying which turnstile a user intends to enter. The temperature outside may affect the paths or habits of users. For example, if two doorways are near each other, but one leads outside, the PACS may determine the outside doorway is likely to be the intended doorway if it is currently freezing outside.

The PACS may be connected to additional systems that may not require a key device to access but provide indications of actions by a person that may subsequently be attempting to gain entry to a doorway controlled by PACS. This may include Internet-of-Things (IoT) devices. Examples of devices and systems that a person may interact with which could provide intent indications and behavior patters to the PACS may include garage door opener, thermostat, smart lighting, television, and appliances.

The PACS may use a neural network that is trained with user habits to anticipate and identify the intent of a user accessing a doorway. This may include identifying different actions or connections a user may be performing, such as with their mobile device. For example, an office may have a gym for people to use. Tara may walk by the door and reader to the gym multiple times a day as part of her normal workday. However, when Tara does use the gym, she usually is listening to music with her Bluetooth ear buds. The PACS neural network may use this data to identify that Tara typically intends to enter the gym when she is using her ear buds, but otherwise the intent to enter is very low.

The PACS neural network may be trained with the habits of each user to identify common user actions and sequences of actions that may be used to identify intended doorways and points of entry. For example, a typical day for a person may include entering a building access point, entering an access point for their floor, and then accessing a secure room. Some of these access points may have multiple options, such as the floor may have different doors for different tenants. The habit data may include other data to identify changes to the habit. For example, the previously described habit may be for when the person reaches the office in the morning. However, at lunch time, the person may return with lunch and go to the lunch room which is through a different doorway on the floor.

The trained neural network may be used to identify the intent of unknown or new users. For example, a new employee may begin working and thus specific habit data does not exist for the employee. The PACS neural network identifies that the employee works in accounting and thus uses the trained data for other accounting employees to identify the intent of the new employee.

The PACS may receive data about other applications and functions the user performs with their mobile device. For example, the user may have Wi-Fi connected lights in an office or meeting room. The user may turn the lights on with their mobile device before they reach the doorway to such a room. The PACS may use this action data to identify that the user intends to enter the room.

The PACS neural network may combine multiple factors to identify the intent of a person to enter a doorway and the timing with which to release the credentials for entering a doorway. For example, determining that a user's normal routine may be affected by the temperature.

The reader may perform a preliminary authentication when the credential is received by BLE to identify if the credential provided by the key device should be authenticated and if any further communication should occur with the key device, such as ranging with UWB. If the reader is able to determine with a broad verification that the credential provided will not authenticate, then the power and processing cost of using UWB to range the key device is eliminated.

The preliminary authentication may be performed using blacklists or whitelists. The blacklists and whitelists may have conditional factors, such as a time condition. For example, a building may restrict access during the night and thus from 8:00 PM to 6:00 AM a whitelist is used that only includes security and maintenance.

The preliminary authentication may be performed through regular expression matching and similar pattern identification. The reader may receive a credential through the BLE communication with a key device. The reader, using a regular expression for the format sequence of a credential which is accepted at that reader for entry, may identify if the received credential is of the correct format sequence. If not, then the reader may discard the credential and cease communication with the key device. As an example, the credentials accepted by the reader for entry may be of a format sequence of the letter "K" followed by six numeric digits. If the credential provided is of a format sequence of the letters "WX" followed by seven numeric digits then the reader may dismiss the credential and not cache or authenticate it, including ceasing any communication or ranging to save power and processing.

The PACS may initiate additional precautions for accessing a secure doorway based on the people near the person attempting access to the doorway, such as to prevent tailgaters (e.g., a person that attempts to gain access by following an authorized person). If the PACS identifies unauthorized key devices near an authorized key device, this may increase the threshold for identifying intent, as well as only unlocking the doorway when the authorized key device is very close to the doorway. The same may be applied if a camera were used with the PACS and there are persons without key devices near a person with an authorized key device.

Figure 5:
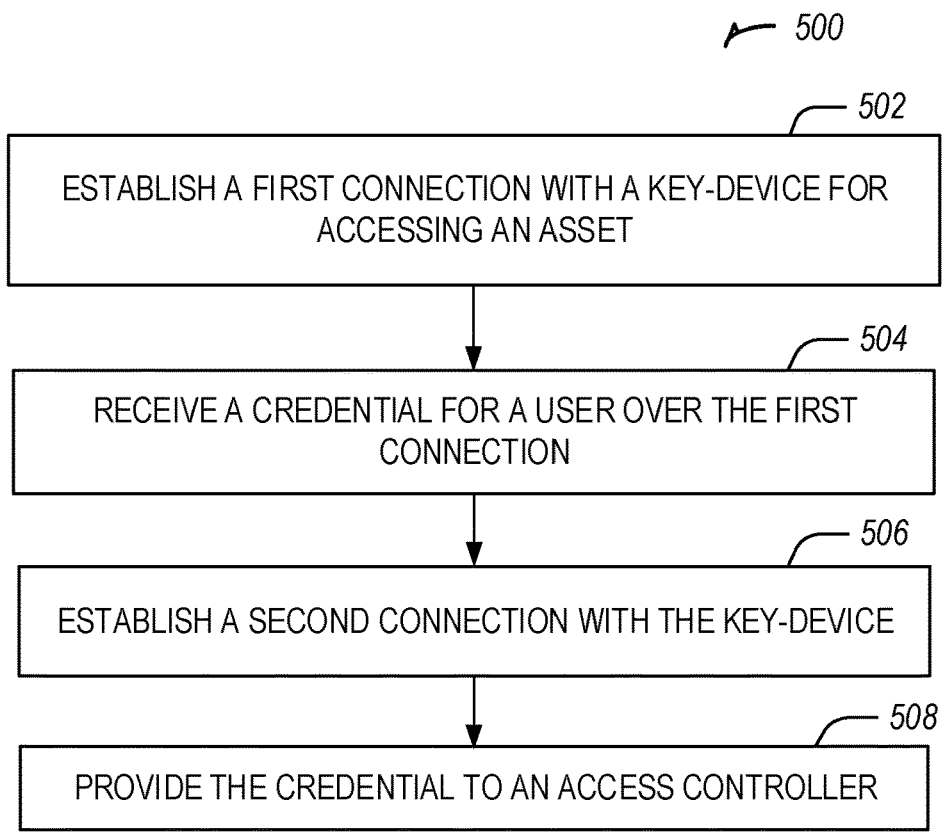
FIG. 5 illustrates a flowchart showing a technique for regulating access to an asset, in accordance with some embodiments.

FIG. 5 illustrates a flowchart showing a technique 500 for regulating access to an asset, in accordance with some embodiments. The technique 500 may be used to regulate access to an asset where the asset is a physical location, such as a room, a building, or a home. The technique 500 may be used to regulate access to an asset where the asset is an electronic device, such as a computer, a computer network, a smartphone, or a specific device such as an automatic teller machine.

The technique 500 includes an operation 502 to establish a first connection with a key-device, such as a connection between the key-device and a reader. The first connection may be an NFC such as RFID or PAN technologies, such as the IEEE 802.15.1, Wi-Fi, or BLE. The key-device may a physical card with an integrated circuit which stores information such as credentials and information about the holder of the key-device. The key-device may be a mobile device, such as a smartphone. The mobile device may include an application for interfacing with the reader or include secure elements.

The technique 500 includes an operation 504 to receive a credential for a user over the first connection. Upon establishing the first connection between the reader and the key-device, the key device may transmit a credential, such as a credential for a user, to the reader. The technique 500 may include an operation to store the credential in cache memory of the reader. The credential may be stored in other memory or transmitted to another computer system for storage in the respective memory of the system.

The technique 500 includes an operation 506 to establish a second connection with the key-device. The second connection may be UWB. The technique 500 may include an operation to maintain a location or position of the key-device using the second connection. The location or position may be determined using range detection. The operation of establishing the second connection with key-device may occur based on the interaction of the key-device using the first connection.

The technique 500 may include an operation to authenticate the credential for the user associated with the credential to access the asset. Authenticating may include transmitting the credential to authentication authority. The technique 500 may include an operation to receive a validation indication from the authentication service and thus permit access to the asset.

The technique 500 includes an operation 508 to provide the credential to an access controller. Providing the credential to the access controller may include an operation to transfer the credential from the cache memory. Providing the credential to the access controller may be based on determining the user intends to access the asset. The access controller may include a physical access control system controller.

The technique 500 may, in determining the user intends to access the asset, include an operation to determine a set of location points of the key-device using the second connection. The location points may be locations, positions, or ranges from the reader detected through UWB. The technique 500 may include an operation to calculate a probability the user will access the asset using the set of location points. The technique 500 may include an operation to determine the probability exceeds a predetermined threshold. Depending on the asset and the type of security access, the threshold may be adjusted, thus a high probability threshold may be in place for more secure assets and a low probability threshold may be in place for less secure assets.

The technique 500 may include an operation to receive a validation indication from the access controller and permit access to the asset. For example, the credential may be validated that the user may access the asset. The asset may be doorway or secure entry point, or the asset may be an electronic device.

The technique 500 may include an operation to remove the credential from the cache memory. Removing the credential from the cache memory may be based on receiving an indication the user is not permitted to access the asset. For example, the credential may not be validated, and the reader may receive an indication that the user may not access the asset. Removing the credential from the cache memory may be based on losing the second connection with the key-device. For example, if the key-device moves out of range of the second connection, this may indicate that the key-device (and the user) are no longer near the reader and thus the intent to access the asset is low and thus the credential is removed from the cache memory. Removing the credential from the cache memory may be based on an elapsing of a predetermined time. For example, from the time the second connection is established, if the key-device is not used to access the asset within a predetermined time period, then the credential may be removed from the cache memory. This may be performed to save memory and resources. The user may be required to perform an action, such as placing the key-device on the reader, to transfer the credential again and attempt to access the asset.

Figure 6:
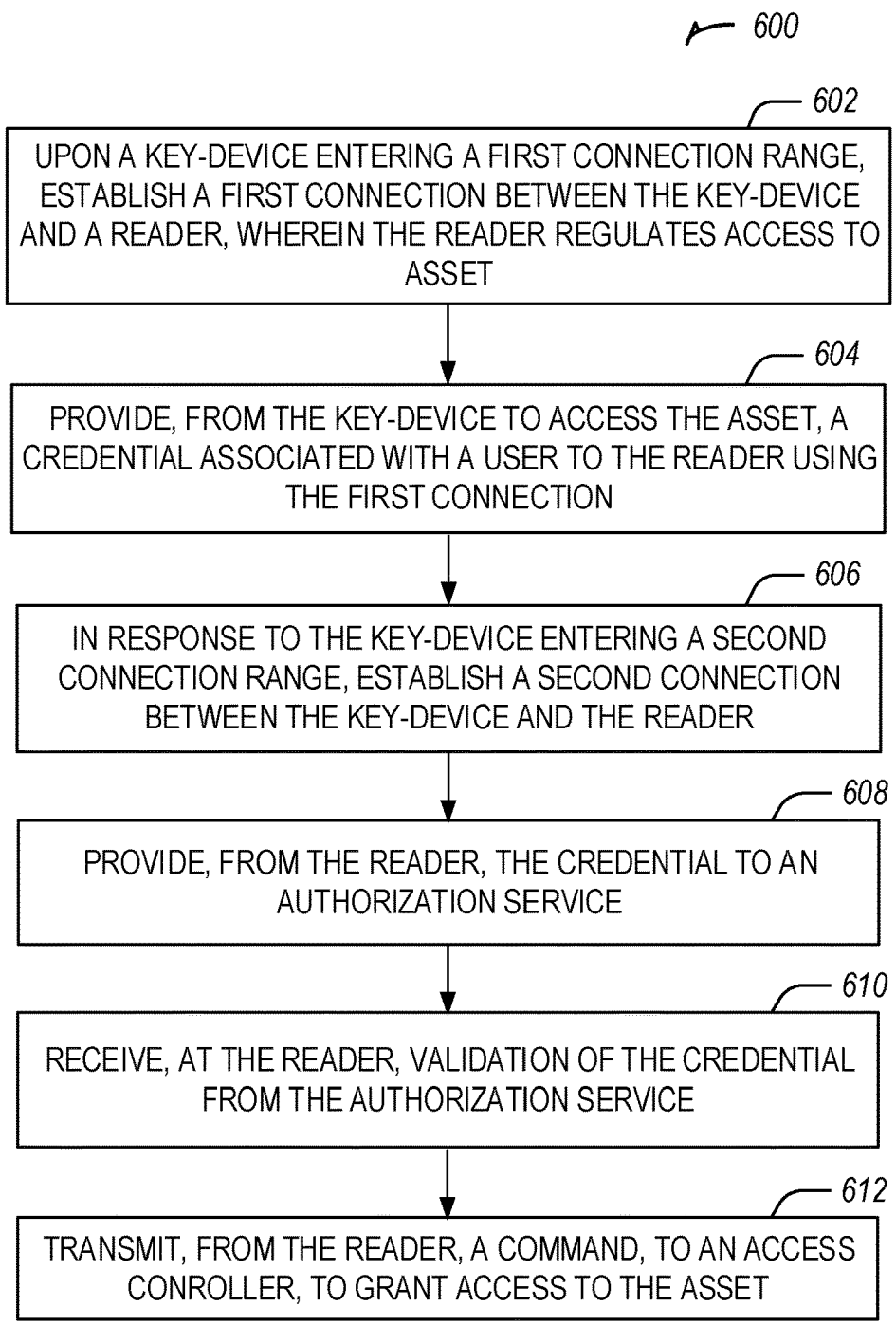
FIG. 6 illustrates a flowchart showing a technique for regulating access to an asset using a key-device, in accordance with some embodiments.

FIG. 6 illustrates a flowchart showing a technique 600 for regulating access to an asset using a key-device, in accordance with some embodiments. The technique 600 may be used to regulate access to an asset where the asset is a physical location, such as a room, a building, or a home. The technique 600 may be used to regulate access to an asset where the asset is an electronic device, such as a computer, a computer network, or a smartphone.

The technique 600 includes, upon the key-device entering a first connection range, an operation 502 to establish a first connection between the key-device and a reader. The first connection may be a PAN such as through BLE. The technique 600 includes an operation 604 to provide, from the key-device, a credential associated with a user to the reader using the first connection.

The technique 600 includes an operation 606 to establish a second connection between the key-device and the reader. The second connection may be UWB. The second connection is based on the key-device entering a second connection range. For example, UWB does not have as large a range as BLE. The key-device may first establish a connection with the reader through BLE. As the key-device moves closer to the reader and is within UWB range, the key-device and the reader may establish a second connection over UWB. Through UWB, the range or location of the key-device may be determined.

The technique 600 includes an operation 608 to provide, from the reader, the credential to an authorization service. The reader may transmit the credential to receive authorization for the user of the key-device to access the asset. The technique 600 includes an operation 610 to receive, at the reader, validation of the credential from the authorization service. If the credential does not have permission to access the asset, the reader may receive a denial from the authorization service.

The technique 600 includes an operation 612 to transmit, from the reader, a command, to an access controller, to grant access to the asset. This may be a command to unlock a doorway or a command to unlock an electronic device for use. Providing the credential to the access controller may be based on determining the user intends to access the asset. The technique 600 may include, in determining the user intends to access the asset, an operation to determine, at the reader, a set of location points of the key-device using the second connection. This may be performed through range detection using UWB. The technique 600 may include an operation to calculate a probability the user will access the asset using the set of location points and determine the probability exceeds a predetermined threshold.

Determining the user intends to access the asset may be based in part on sensor data collected from a sensor of the key-device. For example, a GPS of the key-device may provide location information or an accelerometer of the key-device may provide movement information, such as that the user is running.

Figure 7:
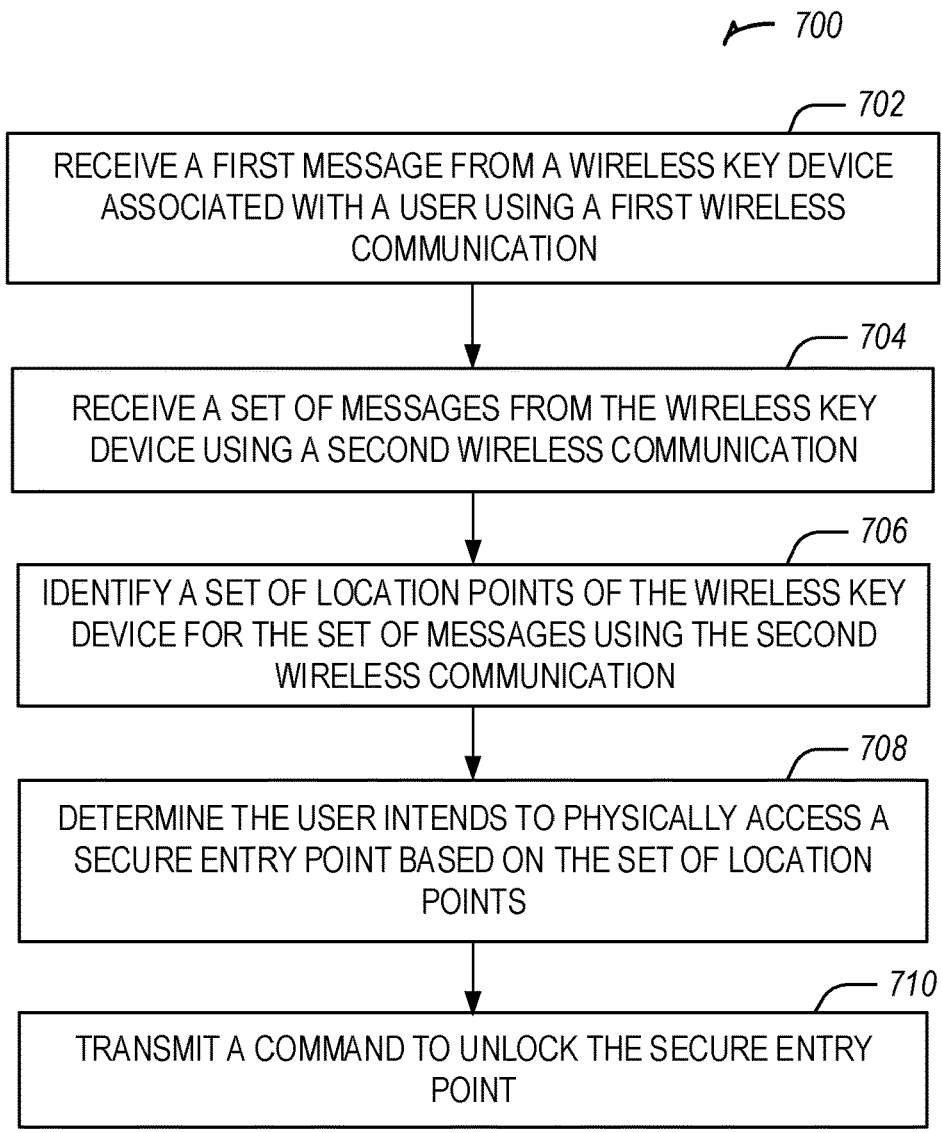
FIG. 7 illustrates a flowchart showing a technique for regulating access to an asset, in accordance with some embodiments.

FIG. 7 illustrates a flowchart showing a technique 700 for regulating access to an asset, in accordance with some embodiments. The technique 700 includes an operation 702 to receive a first message from a wireless key device associated with a user using a first wireless connection. The PACS may receive the first message at a reader for a secure entry point. The first message may include a user credential. The first wireless connection may be an NFC such as RFID or PAN technologies, such as the IEEE 802.15.1 and BLE.

The technique 700 includes an operation 704 to receive a set of messages from the wireless key device using a second wireless connection. The second wireless connection may be UWB. The set of messages may be a series of communications back and forth between the reader and the key device. The communications may include a seed or hashed counter to provide security and prevent spoofing of the key device.

The technique 700 includes an operation 706 to identify a set of location points of the wireless key device for the set of messages using the second wireless connection. Using a communication technology such as UWB, the PACS may identify locations of the key device or ranges of the key device to the reader or a plurality of readers.

The technique 700 includes an operation 708 to determine the user intends to physically access a secure entry point based on the set of location points. The secure entry point may be one of a plurality of secure entry points within range of the second wireless connection. The technique 700 includes a further operation to determine the user intends to physically access the secure entry point from the plurality of secure entry points based on calculating a trajectory from the set of location points.

The technique 700 includes a further operation to calculate a probability the user will physically access the secure entry point using the set of location points and determine the probability exceeds a predetermined threshold. For example, the reader may identify multiple radii of ranges from the reader. For each progressively closer range the key device is determined to be within, the probability may increase. If the key device is determined to stop within one of the ranges or if the key device returns to a further range, then the probability may decrease. A predetermined threshold may be used to identify when the probability, or intent, is high enough that the secure entry point should be released. The threshold may be dependent on factors such as the level of security for the area being accessed (i.e., meeting room or development laboratory), the number of other entry points nearby, and frequency of the particular key device accessing the secure entry point.

The technique 700 includes an operation 710 to transmit a command to unlock the secure entry point. There are many types of secure entry points, such as doorways, turnstiles, pass through gates, elevators, and parking arms. To unlock the secure entry point includes any applicable method for the type of secure entry point which would provide for the restricted access to become unrestricted to the holder of the key device.

The technique 700 includes a further operation to transmit the credential to an authorization service. The authorization service may be local to the reader, such as in a residential home. The authorization service may be connected to the reader through a network or the Internet to provide credential authorization to multiple locations or entry points. The authorization service may be integrated into the reader. The technique 700 includes a further operation to receive an indication the user is authorized to access the secure entry point from the authorization service. The authorization service may validate the credential and return an indication to the reader that the holder of the credential is authorized or not authorized to enter the secure entry point.

Figure 8:
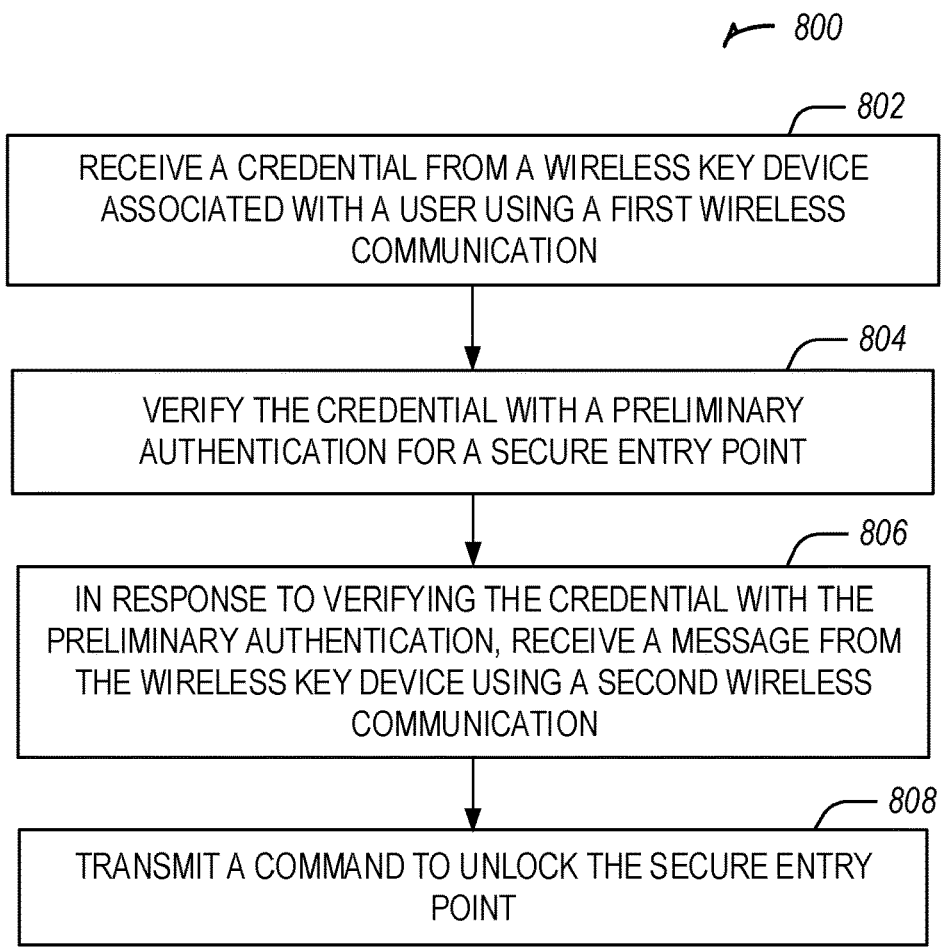
FIG. 8 illustrates a flowchart showing a technique for regulating access to an asset, in accordance with some embodiments.

FIG. 8 illustrates a flowchart showing a technique 800 for regulating access to an asset, in accordance with some embodiments. The technique 800 includes an operation 802 to receive a credential from a key device associated with a user using a first wireless connection. The first wireless connection may be an NFC such as RFID or PAN technologies, such as the IEEE 802.15.1 and BLE.

The technique 800 includes an operation 804 to verify the credential with a preliminary authentication for the asset. The preliminary authentication may take place at the reader or device local to the reader. The preliminary authentication may include identifying that the credential includes a pattern using pattern matching. The pattern may be defined using a regular expression. The technique 800 includes an operation to verify the credential with the preliminary authentication by comparing the credential to a whitelist of credentials. The whitelist may be applied in the preliminary authentication based on time of day. For example, the whitelist may identify a group of people which are permitted to enter an office building at night and on the weekend.

The technique 800 includes, in response to verifying the credential with the preliminary authentication, an operation 806 to establish a second wireless connection with the key device. The second wireless connection may be UWB. Using a communication technology such as UWB, the PACS may identify locations of the key device or ranges of the key device to the reader or a plurality of readers.

The technique 800 includes operations to transmit the credential to an authorization service and to receive an indication the user is authorized to access the asset from the authorization service. The preliminary authorization is performed to help eliminate any credentials that would automatically be rejected by the authorization service as they may not fit the correct format or pattern. This may eliminate the time and processing of transmitting and authenticating these credentials. The technique 800 includes an operation 808 to provide a command to grant access to the asset.

Figure 9:
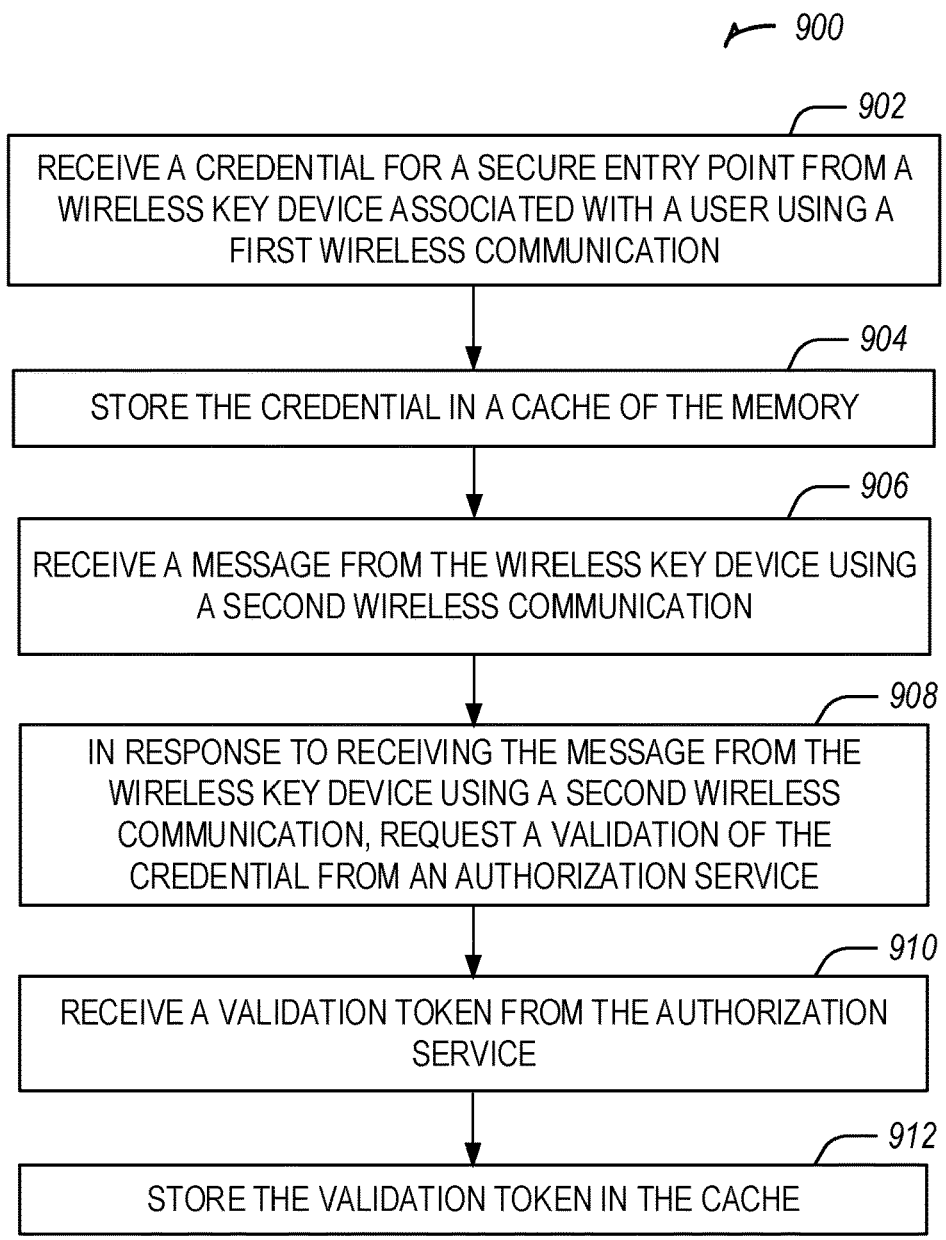
FIG. 9 illustrates a flowchart showing a technique for regulating access to an asset, in accordance with some embodiments.

FIG. 9 illustrates a flowchart showing a technique 900 for regulating access to an asset, in accordance with some embodiments. The technique 900 includes an operation 902 to receive a credential for an asset from a key device associated with a user using a first wireless connection. The first wireless connection may be an NFC such as RFID or PAN technologies, such as the IEEE 802.15.1 and BLE.

The technique 900 includes an operation 904 to store the credential in a cache of the memory. The PACS may cache the credential in memory, such as memory of the reader, for future authentication when the intent of the user to enter the asset. The intent threshold to authenticate the credential may be lower than the intent threshold to unlock access to the asset. For example, as a user moves toward a doorway, the PACS may determine a 60% probability the user is intending to enter the doorway and transmits the credential to the authentication service. As the user continues toward the door, the probability may change to 90% and the reader then transmits the command to unlock the doorway.

The technique 900 includes an operation 906 to establish a second wireless connection with the key device. The second wireless connection may be UWB. Using a communication technology such as UWB, the PACS may identify locations of the key device or ranges of the key device to the reader or a plurality of readers.

The technique 900 includes, in response to establishing the second wireless connection with the key device, an operation 908 to request a validation of the credential from an authorization service. The authorization service may be local to the reader, such as in a residential home. The authorization service may be connected to the reader through a network or the Internet to provide credential authorization to multiple locations or entry points. The authorization service may be integrated into the reader.

The technique 900 includes an operation 910 to receive a validation token from the authorization service. The validation token may be used to transmit to the authorization service or an access control service to indicate the provided credential has been validated. The technique 900 includes an operation 912 to store the validation token in the cache.

The technique 900 may further include an operation to determine the key device is within a first range radius of a plurality of range radii using the second wireless connection, wherein the plurality of range radii extend from a wireless key device reader. The PACS may identify distance ranges from the reader. For example, the PACS may designate three ranges, the first is within a five foot radius of the reader, the second is within a five to ten foot radius of the reader, and the third is within a ten to fifteen foot radius of the reader.

The technique 900 may further include an operation to determine the key device is within a second range radius of a plurality of range radii using the second wireless connection, wherein the second range radius is closer to the wireless key device reader than the first range radius. From the previous example of the three ranges, the PACS may determine, using UWB, that the key device was originally within the third range and has moved into the second range.

The technique 900 may further include an operation to calculate a probability the user intends to physically access the asset based on determining the wireless key device is within the second range radius. From the previous example, the key device has moved from a further distance range to a closer distance range, thus increasing the probability the user is moving toward the reader.

The technique 900 may further include an operation to determine the probability exceeds a predetermined threshold. The technique 900 may further include an operation to transmit the validation token to an access control service. Based on the probability exceeding a threshold, the PACS may transmit the validation token to the access control service to indicate the asset should be unlocked. The technique 900 may further include an operation to receive a command to grant access to the asset. The authorization service and the access control service may be integrated into the PACS, may be networked to the PACS, or may be separate services to the PACS.

The technique 900 may further include an operation to determine the key device is within a second range radius of a plurality of range radii using the second wireless connection, wherein the second range radius is further from the wireless key device reader than the first range radius. From the previous example of the three ranges, the PACS may determine, using UWB, that the key device was originally within the second range and has moved further away into the third range.

The technique 900 may further include an operation to remove the validation token and credential from the cache. From the previous example, the key device has moved from a closer distance range to a further distance range, thus increasing the probability the user is not intending to access the asset, and thus the stored information, such as the credential and validation token, are removed from the cache.

The technique 900 may further include an operation to determine a response from the key device has not been received within a predetermined time period. When the PACS sends the message, it may start a timer. When the PACS receives a response from the wireless key device, the timer may be canceled. If the timer times out, based on a determined timeout time, then the PACS may determine that the wireless key device is no longer within range and thus the probability the user intends to access the asset is very low. The technique 900 may further include an operation to remove the validation token and credential from the cache based on them no longer being needed.

Figure 10:
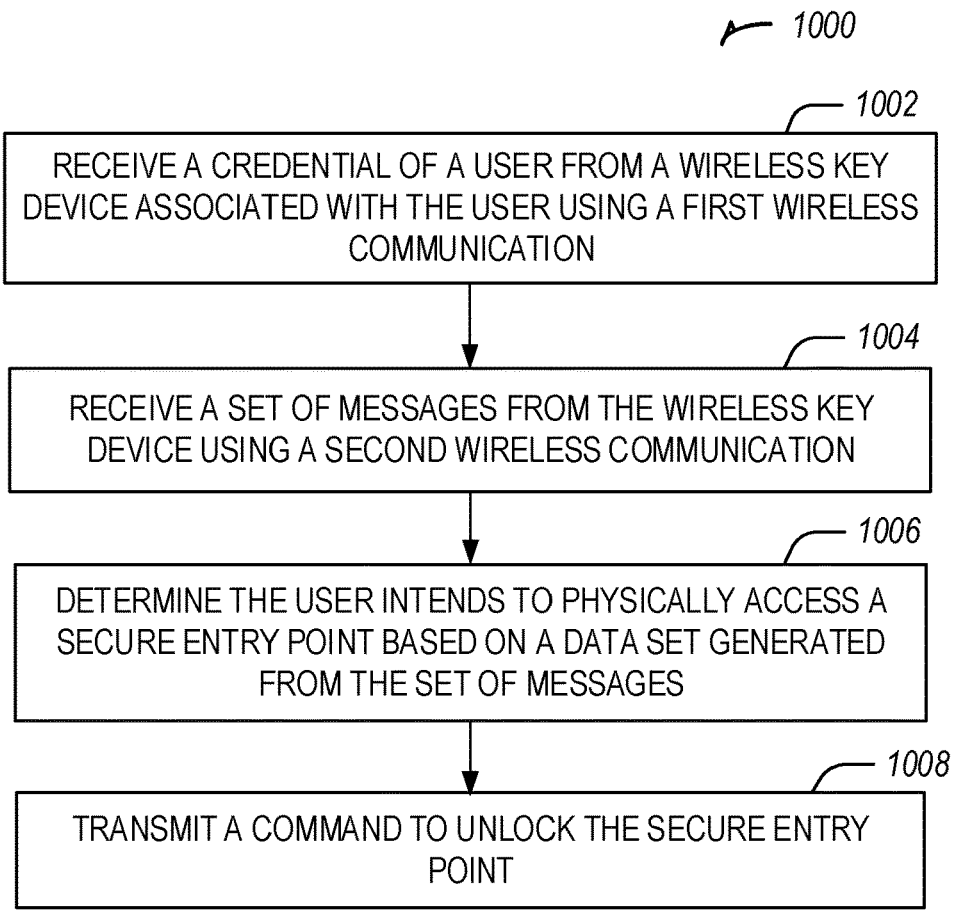
FIG. 10 illustrates a flowchart showing a technique for regulating access to an asset, in accordance with some embodiments.

FIG. 10 illustrates a flowchart showing a technique 1000 for regulating access to an asset, in accordance with some embodiments. The technique 1000 includes an operation 1002 to receive a credential of a user from a key device associated with the user using a first wireless connection. The first wireless connection may be an NFC such as RFID or PAN technologies, such as the IEEE 802.15.1 and BLE.

The technique 1000 includes an operation 1004 to establish a second wireless connection with the key device. The second wireless connection may be UWB. Using a communication technology such as UWB, the PACS may identify locations of the key device or ranges of the key device to the reader or a plurality of readers.

The technique 1000 includes an operation 1006 to determine the user intends to access the asset based on a data set generated derived from the second wireless connection. The PACS may determine location information from the second wireless connection by using UWB. The second wireless connection may include information from the key device, such as sensor data from sensors of the key device. The data set may include data both provided from the key device and derived from the second wireless connection that may be used to determine the intent of the user.

The technique 1000 may, in determining the user intends to access the asset, include an operation to determine a probability the user intends to access the asset using the data set and a trained machine learning model. The trained machine learning model is trained with data sets collected from a plurality of users. The data sets may include movement data for the plurality of users within a range of the asset. The data sets may include movement data from the plurality of users. The information received from the wireless key device may include movement data of the user collected from an accelerometer of the wireless key device.

For example, for a particular asset or secure entry point, location and movement data for how different people approach and move toward the secure entry point when entering the secure entry point and data for when people do not enter the secure entry point may be used to train the machine learning model. This training may provide for the machine learning model to recognize how people may move and angles of their approach, when their intent is to enter the secure entry point. The data sets may include a time of day timestamp and the data set of the user may be timestamped. Including the time in the training of the machine learning model may indicate different patterns and actions based on the time of day. For example, people may be less likely to access the secure entry point at lunch time.

The determination that the user intends to access an asset may include using data received from a calendar system. The technique 1000 may further include an operation to identify an event in the calendar system associated with the asset. For example, the calendar system may indicate that a meeting is occurring in the room attached to the secure entry point. The technique 1000 may further include an operation to identify an indication of attendance to the event by the user. The calendar system may provide a list of attendees to the meeting and the PACS may identify that the user is one of those attendees, which may increase the probability the user intends to enter the secure entry point. The technique 1000 includes an operation 1008 to transmit a command to grant access to the asset.

Figure 11:
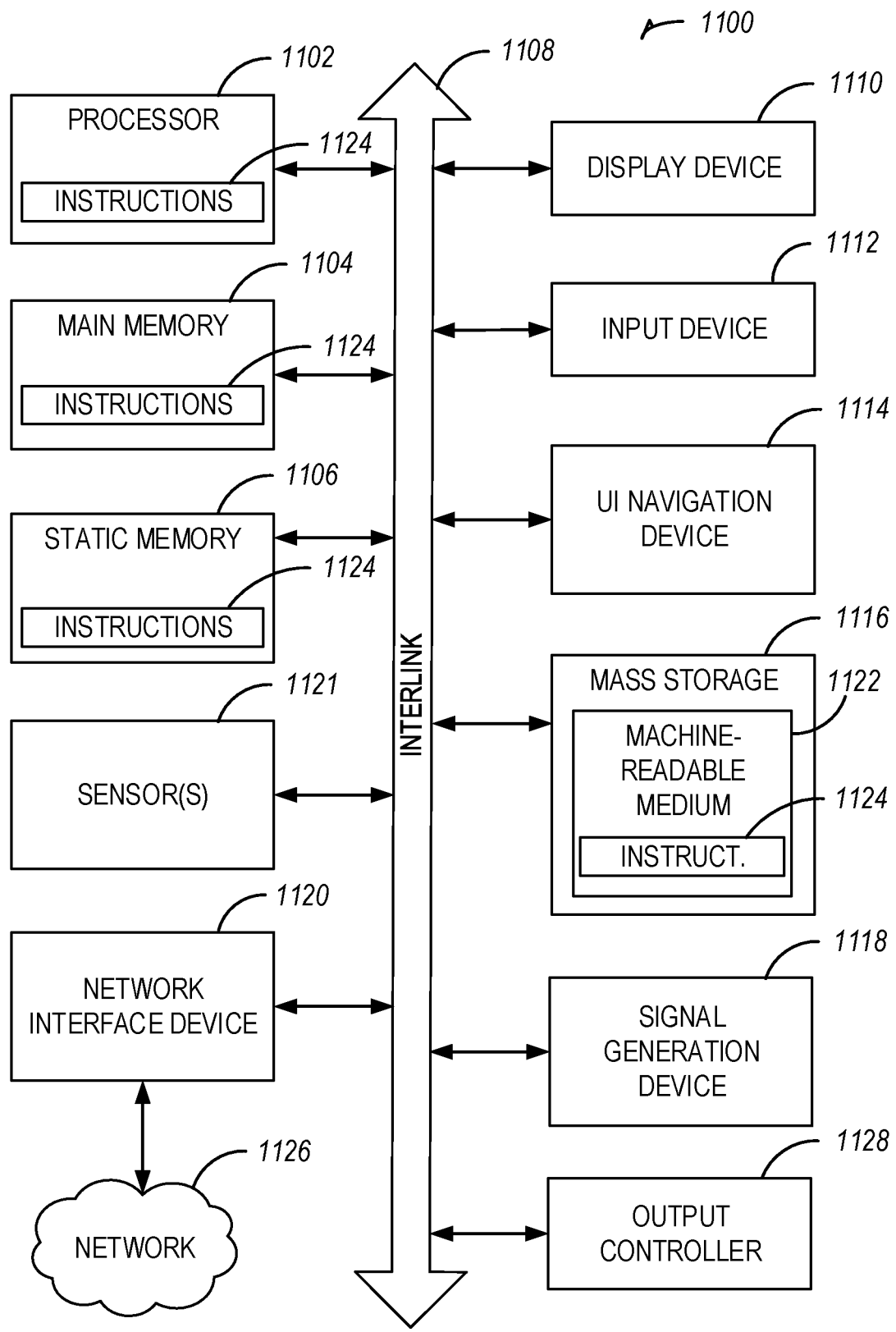
FIG. 11 is a block diagram illustrating an example of a machine upon which one or more embodiments may be implemented.

FIG. 11 illustrates a block diagram of an example machine 1100 upon which any one or more of the techniques (e.g., methodologies) discussed herein may perform. In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1100 may include a hardware processor 1102 (e.g., a central processing unit (CPU), a graphics processing unit (GPU), a hardware processor core, field programmable gate array (FPGA), or any combination thereof), a main memory 1104 and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a machine readable medium 1122 on which is stored one or more sets of data structures or instructions 1124 (e.g., software) embodying or used by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method of regulating access to an asset in an access control system, the method comprising:
    establishing a first wireless connection with a key-device using a low power communication protocol;
    receiving a credential for a user of the key device over the first wireless connection;
    establishing a second wireless connection with the key-device using Ultra-Wideband (UWB);
    determining the user intends to access the asset, wherein determining the user intends to access the asset comprises determining the user meets a first intent threshold based on the second wireless connection; and
    permitting access to the asset in response to determining the user intends to access the asset and determining the user meets a second intent threshold based on the second wireless connection.

2. The method of claim 1, wherein the first intent threshold is lower than the second intent threshold.

3. The method of claim 2, wherein the low power communication protocol is Bluetooth Low Energy.

4. The method of claim 2, wherein the asset is a physical location.

5. The method of claim 2, wherein the asset is an electronic device.

6. The method of claim 2, further comprising:
    providing the credential to an authorization service for validation; and
    receiving a validation indication from the authorization service.

7. The method of claim 6, wherein providing the credential to an authorization service for validation is done in response to determining the user intends to access the asset.

8. The method of claim 6, wherein establishing the second wireless connection is done in response to receiving the validation indication from the authorization service.

9. The method of claim 6, wherein permitting access to the asset is additionally in response to receiving the validation indication from the authorization service.

10. The method of claim 6, wherein the authorization service is local to a reader establishing the first and second wireless connections.

11. The method of claim 6, wherein the authorization service is networked with a reader establishing the first and second wireless connections.

12. The method of claim 2, further comprising:
    storing the credential in cache memory; and
    removing the credential from the cache memory based on losing the second connection with the key-device.

13. The method of claim 2, further comprising:
    storing the credential in cache memory; and
    removing the credential from the cache memory based on an elapsing of a predetermined time.

14. A non-transitory machine readable medium comprising instructions, that when executed by at least one processor, cause the processor to perform operations comprising:
    establishing a first wireless connection with a key-device using a low power communication protocol;
    receiving a credential for a user of the key device over the first wireless connection;
    establishing a second wireless connection with the key-device using Ultra-Wideband (UWB);
    determining the user intends to access the asset, wherein determining the user intends to access the asset comprises determining the user meets a first intent threshold based on the second wireless connection; and
    permitting access to the asset in response to determining the user intends to access the asset and determining the user meets a second intent threshold based on the second wireless connection.

15. The machine readable medium of claim 14, wherein the first intent threshold is lower than the second intent threshold.

16. The machine readable medium of claim 15, wherein the low power communication protocol is Bluetooth Low Energy.

17. The machine readable medium of claim 15, further comprising instructions, that when executed by the least one processor, cause the processor to perform operations comprising:
    providing the credential to an authorization service for validation; and
    receiving a validation indication from the authorization service.

18. The machine readable medium of claim 17, wherein providing the credential to an authorization service for validation is done in response to determining the user intends to access the asset.

19. The machine readable medium of claim 17, wherein establishing the second wireless connection is done in response to receiving the validation indication from the authorization service.

20. The machine readable medium of claim 17, wherein permitting access to the asset is additionally in response to receiving the validation indication from the authorization service.

* * * * *